United States Patent [19]
Swartz et al.

[11] Patent Number: 6,102,290
[45] Date of Patent: *Aug. 15, 2000

[54] SELF-CHECKOUT, POINT-OF-TRANSACTION SYSTEM INCLUDING DEACTIVATABLE ELECTRO-OPTICALLY CODED SURVEILLANCE TAGS

[75] Inventors: Jerome Swartz, Old Field; William Tracy, Floral Park, both of N.Y.

[73] Assignee: Symbol Technologies, Inc., Holtsville, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/113,685

[22] Filed: Jul. 10, 1998

Related U.S. Application Data

[62] Division of application No. 08/747,553, Nov. 12, 1996, Pat. No. 5,814,799, which is a division of application No. 07/919,410, Jul. 27, 1992, Pat. No. 5,594,228, which is a continuation-in-part of application No. 07/728,575, Jul. 11, 1991, abandoned, which is a continuation of application No. 07/414,450, Sep. 29, 1989, abandoned, which is a continuation of application No. 07/236,249, Aug. 25, 1988, abandoned.

[51] Int. Cl.[7] ........................................ G06K 7/10
[52] U.S. Cl. .............................. 235/462.01; 235/375
[58] Field of Search ........................... 235/472.02, 375, 235/462.01

[56] References Cited

U.S. PATENT DOCUMENTS

| | | | |
|---|---|---|---|
| 4,418,277 | 11/1983 | Tremmel et al. | 235/472.02 |
| 4,575,624 | 3/1986 | Klinkhardt | 235/449 |
| 4,881,061 | 11/1989 | Chambers | 340/572 |
| 4,939,356 | 7/1990 | Rando et al. | 235/472 |
| 5,005,125 | 4/1991 | Farrar | 364/403 |
| 5,059,951 | 10/1991 | Kaltner | 340/551 |
| 5,151,684 | 9/1992 | Johnsen | 340/551 |
| 5,187,354 | 2/1993 | Bengtsson | 235/472 |
| 5,280,159 | 1/1994 | Schultz et al. | 235/380 |
| 5,288,980 | 2/1994 | Patel et al. | 235/381 |

FOREIGN PATENT DOCUMENTS 2 161 631  1/1986  United Kingdom ................... 235/383

*Primary Examiner*—Donald Hajec
*Assistant Examiner*—Mark Tremblay

[57] ABSTRACT

A self-check apparatus is provided for processing a sales transaction of an article having an attached surveillance tag, each attached surveillance tag bearing a coded indicia such as a bar code. The self-checkout apparatus stores an indication of the articles which have been selected for purchase. When the surveillance tag is presented to the apparatus for deactivation, the bar code on the tag is scanned, and a check is made to verify that the surveillance tag is attached to an article which has been selected for purchase, and provided such verification is made, the surveillance tag is deactivated.

16 Claims, 17 Drawing Sheets

SELF-CHECKOUT, POINT-OF-TRANSACTION SYSTEM INCLUDING DEACTIVATABLE ELECTRO-OPTICALLY CODED SURVEILLANCE TAGS

CROSS-REFERENCE TO RELATED APPLICATIONS

This application is a division of application Ser. No. 08/747,553, filed Nov. 12, 1996, now U.S. Pat. No. 5,814,799 which is division of application Ser. No. 07/919,410, filed Jul. 27, 1992 and issued as U.S. Pat. No. 5,594,228 on Jan. 14, 1997, which is a continuation-in-part of U.S. patent application Ser. No. 728,575, filed Jul. 11, 1991, which, in turn, is a continuation of U.S. patent application Ser. No. 414,450, filed Sep. 29, 1989, which, in turn, is a continuation-in-part of U.S. patent application Ser. No. 236,249, filed Aug. 25, 1988, all said applications being assigned to Symbol Technologies, Inc, all of which have been abandoned.

BACKGROUND OF THE INVENTION

1. Field of the Invention

This present invention generally relates to laser scanning systems for reading data in the form of indicia such as bar code symbols on articles and, more particularly, to reading such indicia on surveillance tags removably mounted on the articles.

2. Description of the Prior Art

Various types of scanning systems are known in the prior art that are able to read bar code symbols. Bar code symbols are applied to the surface of an article in order to represent data which can be read by a scanner. The data may be used to identify the article or other characteristics thereof. The bar code symbol itself is a coded pattern of indicia comprised of a series of bars of various widths, spaced apart from one another to bound spaces of various widths.

Various types of desk-top or portable, hand-held scanner systems are exemplified by U.S. Pat. Nos. 4,369,361; 4,387,297; and 4,409,470—all of such patents being owned by the assignee of the instant invention and being incorporated by reference herein. Such scanners have generally been designed to operate at a certain working or reading distance from the symbol at a hand-held or stationary position.

Typically, a scanner includes a light source such as a laser or semiconductor device that generates a light beam. The use of semiconductor devices as the light source in scanner systems is especially desirable because of their small size, low cost and low power requirements. The light beam is optically modified, typically by a lens, to form a beam spot of a certain size. It is preferred that the beam spot size be approximately the same as the minimum width between regions of different light reflectivity, i.e., the bars and spaces of the symbol. The relative size of the bars and spaces is determined by the type of coding used, as is the actual size of the bars and spaces. The number of characters per inch represented by the bar code symbol is referred to as the density of the symbol.

The light beam is directed by optical components along a light path toward a target that includes a bar code symbol an the surface. A scanning component is also disposed in the light path. The scanning component may either sweep the beam spot across the symbol and trace a scan line across and past the symbol, or scan the field of view of the scanner or do both. A scanner also includes a sensor or photodetector. The photodetector has a field of view which extends across and slightly past the symbol and functions to detect light of variable intensity reflected off the symbol. The photodetector generates electrical signals representative of the sequences of bars and spaces in the symbol. The electrical signals are then decoded into data descriptive of the symbol.

Various types of electronic article surveillance systems are also known in the prior art. Such systems are used to prevent shoplifting and similar unauthorized removal of articles from a controlled area. More particularly, such systems provide a specially designed tag or label which is attached to the article. The tag or label contains active or passive electronic circuitry or a magnetic media which is responsive in a certain manner to an external electromagnetic field. When the article containing an activated tag or label is passed through a controlled exit, an alarm will be set off. In order to authorize the removal of the article from the control area, the tag or label must be either removed or deactivated by an authorized person. The present invention relates more particularly to surveillance systems that require deactivating of the tag, and to apparatus for deactivating a surveillance tag for authorized removal of the article from the controlled area.

In one surveillance system known in the prior art, sensor-emitter labels or tags contain a semiconductor diode and are applied to articles for the purpose of surveillance. For deactivating such tags, various devices are known in the prior art including, among others, radio frequency generators for burning out the diode. However, such generators are generally high powered and are coupled inductively to the tags by way of an R. F. field.

Another surveillance system involves the use of tags containing ferrite material that can be magnetized or demagnetized by a suitable magnetic field which alters the operating characteristic of the tag, thereby deactivating the same.

There are various devices known in the prior art for deactivation of a surveillance tag. U.S. Pat. No. 4,318,090 discloses a hand-held probe having spaced contacts that are arranged to be applied to and drawn along the surface of a surveillance tag that contains a diode. When the probe contacts engage exposed terminals of the diode, a high current is passed through the diode sufficient to destroy its conducting characteristics and thereby deactivate the tag.

There are a few systems in the prior art which combine both bar code reading and deactivation of surveillance tags. U.S. Pat. No. 4,141,078 discloses an automated library circulation control system for processing library books. The system includes at least one terminal having an optical reader for book identification, and an electromagnetic activator at each terminal for magnetizing and demagnetizing a magnetic strip in each book.

In operation, a book is placed in a book tray at each terminal, and a bar coded label on each book is read by an overhead optical scanner. The book is oriented in the book tray at the terminal with the label facing up and the spine of the book facing the front. The scanner reads a nine digit number on the label and generates signals representing the bar code which are thereupon transferred to a computer.

The electromagnetic activator is operable at about the same time (col. 1, lines 58 and 59) to activate or deactivate the magnetic strip in the book. The activator is located under the book tray and is operative on command from the computer. Failure of a user to deactivate the strip before taking the book from the library will activate an alarm at the library exit.

In all known prior art proposals, no light-reflective, coded indicia are associated with the surveillance tag itself. Either there is no confirmation of the tag removal for the system or such confirmation must depend on less reliable, user-dependent procedures.

Further, there are no know prior art proposals in which a surveillance tag having a coded indicia is associated with specific articles, and where the removal of the tag is enabled only where the specific article has been purchased or has been irrevocably selected for purchase.

Still further, there are no know prior art proposals where the coded indicia is displayed on a liquid crystal display, and where the code indicia is dynamically changeable.

SUMMARY OF THE INVENTION

1. Objects of the Invention

It is an object of the invention to provide a device for reading bar code symbols which deactivates a surveillance tag under user control after it has been determined that the bar code symbol has been successfully read.

It is another object of the invention to provide a two position trigger on a hand-held laser scanner in which one position initiates scanning and a second position deactivates a surveillance tag.

Another object of the invention is to associate coded indicia with the tag itself, thereby enabling tag removal to be automatically confirmed.

It is yet another object of the present invention to associate coded indicia with the surveillance tag itself, where the indicia of the tag is scanned, and based on the scanned indicia, if it is determined that the tag corresponds to an article which has been purchased, the removal of the tag is enabled.

2. Features of the Invention

Briefly, and in general terms, the present invention provides an apparatus for detecting indicia having portions of different light reflectivity such as a bar code symbol on a label, and for deactivating a surveillance tag associated with the label. More particularly, the apparatus includes a switch to initiate scanning a label containing a bar code symbol. A sensor is provided having a field of view and operative for detecting at least a portion of light of variable intensity reflected off the label and for generating an electrical signal indicative of the detected light intensity. The apparatus further includes a processor for processing the electrical signal to determine whether the reflected light of variable intensity is indicative of the presence of a bar code symbol. An enabling signal may be generated if a symbol has been detected. The apparatus also includes a second switch or switch position for transmitting a deactivating signal to the target so that a physical characteristic of the tag is changed so as to deactivate the tag.

Another aspect of the present invention is to provide a method for detecting indicia having portions of different light reflectivity such as a bar code symbol on a label on a target, and for deactivating a surveillance tag associated with the target, including the steps of manually initiating scanning a label containing a bar code symbol and detecting at least a portion of light of variable intensity reflected off the label with a sensor. An electrical signal is generated which is indicative of the detected light intensity. The electrical signal is to determine whether the reflected light of variable intensity is indicative of the presence of a bar code symbol. A deactivation signal may be manually initiated and transmitted to the target so that a physical characteristic of the tag is changed so that the tag is deactivated.

Still another aspect of this invention is to provide a system for, and a method of, processing articles bearing coded indicia identifying the articles in a self-checkout terminal at which surveillance tags are presented. The tags are removably mounted on the articles. Each tag bears light-reflective, coded data identifying a respective article.

An electro-optical reader at the terminal reads the indicia to identity the article to the terminal. Thereupon, the tag is removed by a decoupler or tag removal device at the terminal. In response to such removal, the reader reads the coded data on the removed tag. The terminal now automatically knows that the tag associated with the article has been removed.

The indicia and data are advantageously UPC symbols, and may be the same or different and, preferably, are sequentially numbered.

A still further aspect of this invention is to provide a system for, and method of, reading indicia to identify articles to be purchased, processing the purchase, and then, permitting removal of only those security tags which are attached to purchased articles.

An electro-optical reader at the terminal reads indicia to identify the article to be purchased. After the purchase is completed, the electro-optical reader reads the indicia on a surveillance tag presented for tag removal, and a determination is made as to whether the surveillance tag corresponds to an article which has been purchased. If it is determined that the tag is attached to an article which has been purchased, the terminal permits the decoupling or removal of the tag, and therefore, the article can be removed from the store.

A still further aspect of this invention is to provide a system for, and method of, reading indicia to identify articles to be purchased, processing the purchase, and then, permitting deactivation of only those security tags which are attached to purchased articles.

An electro-optical reader at the terminal reads indicia to identify the article to be purchased. After the purchase is completed, the electro-optical reader reads the indicia on a surveillance tag presented for tag deactivation, and a determination is made as to whether the surveillance tag corresponds to an article which has been purchased. If it is determined that the tag is attached to an article which has been purchased, the terminal permits the deactivating of the tag, and therefore, the article can be removed from the store.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
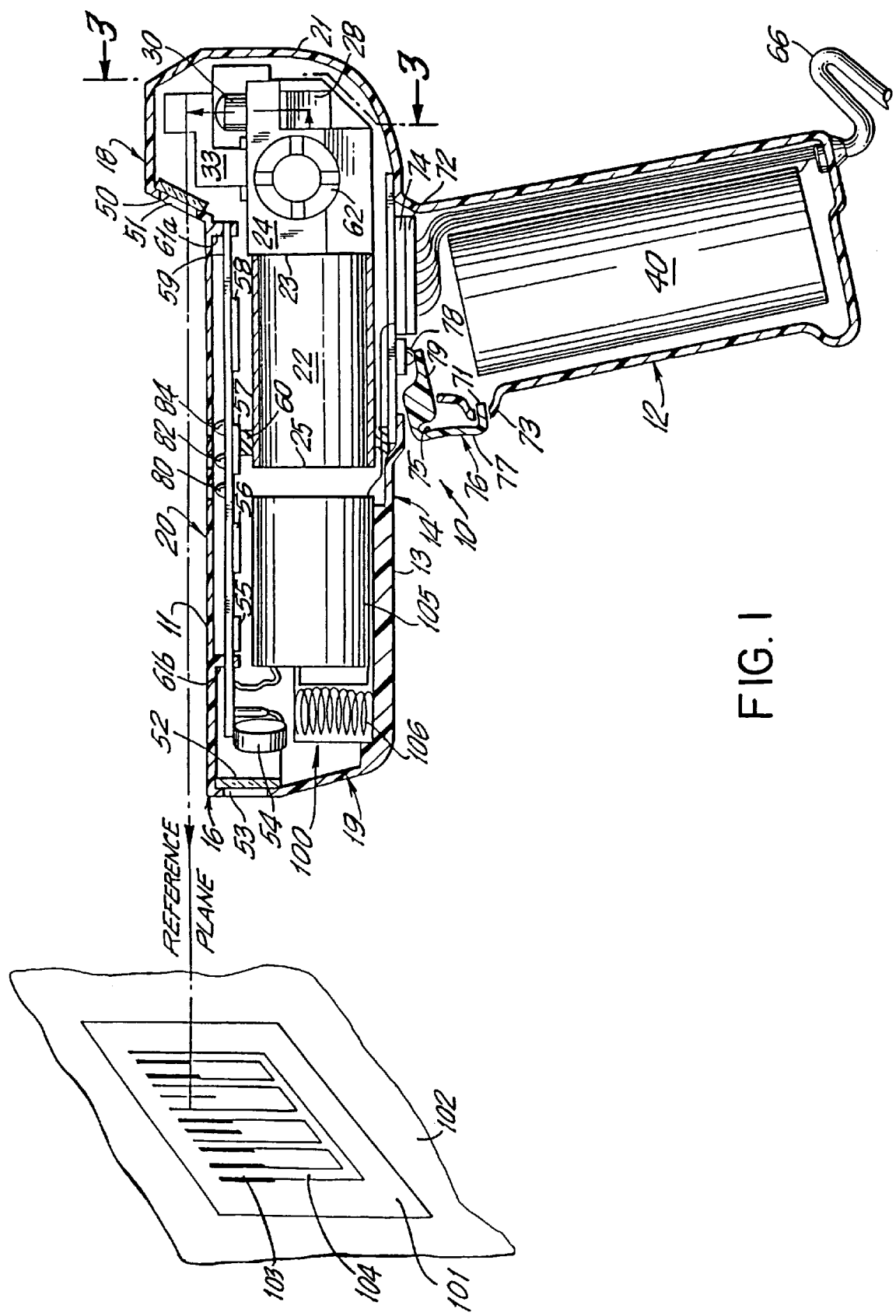
FIG. 1 is a side sectional view of a gun-shaped, narrow-bodied, embodiment of a laser-based portable scanning and deactivation apparatus in accordance with the present invention.

Referring now to FIGS. 1–5 of the drawing, reference numeral 10 generally identifies a light-weight, narrow-bodied, streamlined, narrow-snouted, hand-held, fully portable, easy-to-manipulate, non-arm-and-wrist-fatiguing, laser scanning head supportable entirely by a user for use in a laser scanning system operative for reading, scanning and/or analyzing bar code symbols throughout the reading thereof, and further including deactivation apparatus for changing the state of a surveillance device associated with a tag or label on which the bar code symbol is provided.

Bar code symbols comprise a series of lines and spaces of varying widths, forming a pattern that decodes to a multiple character representing a number, letter or graphic symbol which defines a characteristic of the product or article bearing the symbol. Typical symbol bar codes in current use are the Universal Product Code (UPC), EAN Codabar and Code 39.

Turning now to FIG. 1, the head 10 includes a generally gun-shaped housing having a handle portion 12 and an elongated narrow-bodied barrel or body portion 14.

The handle portion 12 has a cross-sectional dimension and overall size such that it can conveniently fit in the palm of a user's hand. Both the body and handle portions are constituted of a light-weight, resilient shock-resistant, self-supporting material, such as a synthetic plastic material. The plastic housing is preferably injection molded, but can be vacuum formed or blow-molded to form a thin shell which is hollow and bounds an interior space whose volume measures less than about 50 cubic inches. This specific value is not intended to be self-limiting, but has been provided merely to gave an approximation of the overall maximum volume and size of the head 10.

The body portion 14 is generally horizontally elongated along a longitudinal axis, and has a front region 16 at the front end, a raised rear region 18 at the rear end, and an intermediate body region 20 extending between the front and rear regions. The body portion 14 has a top wall 11 above which the raised rear region 18 projects, a bottom wall 13 below the top wall, a pair of opposed side walls 15, 17 spaced transversely apart of each other by a predetermined width-dimension, a front wall or nose 19, and a rear wall 21 spaced rearwardly of the front wall.

A light source means, i.e. laser tube 22 having an anode or output end 23 and a cathode or non-output end 25, is mounted within the body portion 14 lengthwise along the longitudinal axis, and operative for generating an incident collimated laser beam. In lieu of using a laser tube 22, a semiconductor laser may be used as the laser light source. The use of non-laser light, such as from a light emitting diode (LED) or incandescent source is also within the scope of the present invention.

Figure 2:
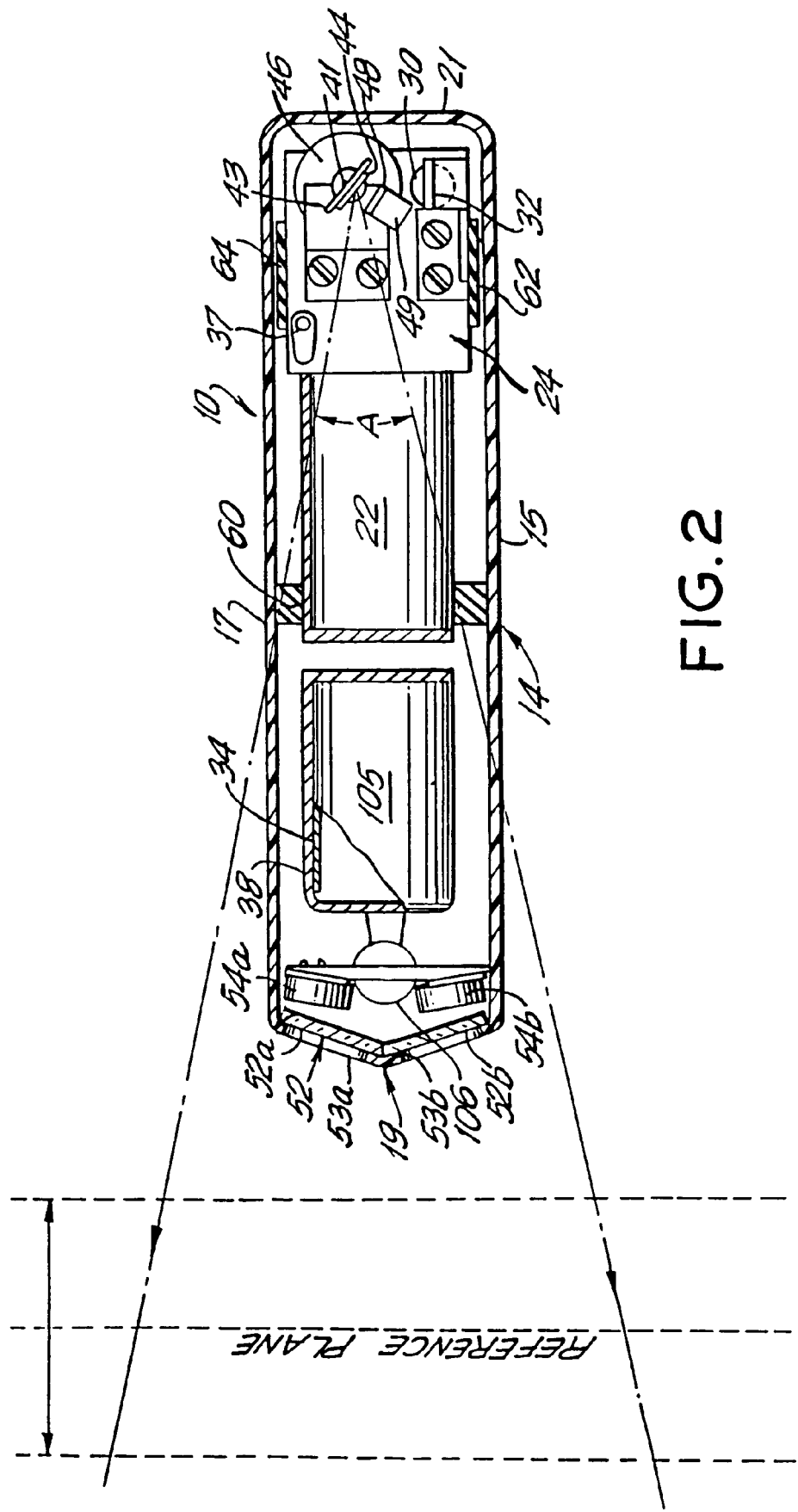
FIG. 2 is a partially broken-away, top sectional view of the embodiment of FIG. 1.
Figure 3:
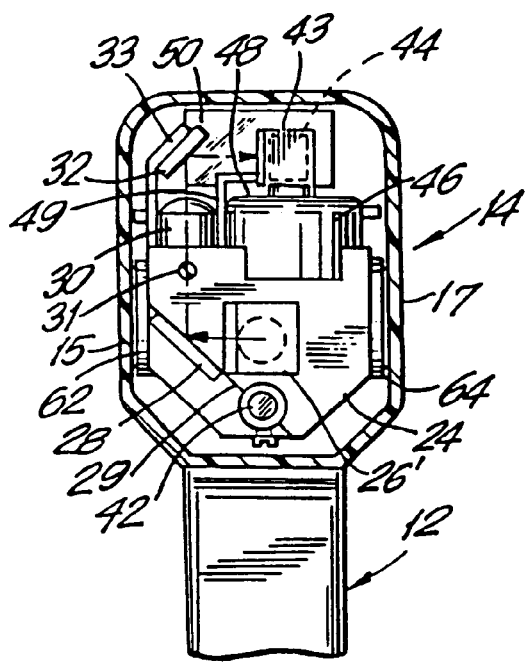
FIG. 3 is a rear sectional view as taken along line 3—3 of FIG. 1.
Figure 4:
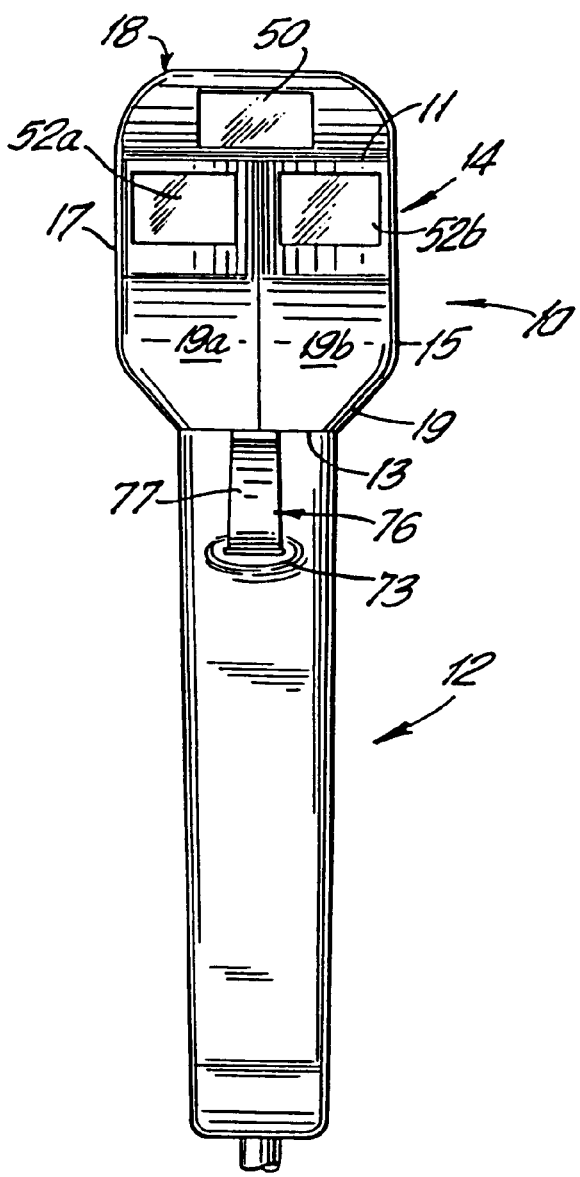
FIG. 4 is a front elevational view of the embodiment of FIG. 1.

An optic means, i.e. an optic train, is likewise mounted within the body portion, and is operative for directing the incident beam along a light path towards a reference plane located exteriorly of the housing in the vicinity of the front region 16, as shown in FIGS. 1 and 2. A bar code symbol to be read is located in the vicinity of the reference plane, that is, anywhere within the depth of focus of the incident beam as described below, and the light reflected from the symbol constitutes a reflected laser beam which is directed along a light path away from the reference plane and back towards the housing. As best shown in FIG. 3, the optic train includes an optical bench 24, a negative lens which is fixedly mounted in a cylindrical bore of the optical bench 24, a light-reflecting mirror 26' which is fixedly mounted on an inclined surface of the bench, another light-reflecting mirror 28 which is fixedly mounted on another inclined surface 29 of the bench, a positive or convex lens 30 which is adjustably mounted on the bench by means of a set screw 31, and still another light-reflecting mirror 32 which is adjustably mounted on the bendable metal bracket 33. The bench 24 is a one-piece light-weight part machined or preferably molded by inexpensive mass-production techniques of a dimensionally stable, flame-retardant material, such as Deirin TM, or glass-filled Noryl TM, preferably having a high dielectric breakdown (on the order of 500 volts/mil). In order to take into account the slight variations in beam alignment which unavoidably result from different light sources and from tolerance variations in the positioning of the light source itself, all elements in the optical path are made large enough to allow the beam to pass unobstructedly even if the beam is not exactly on center. This provides the advantage that the bench can be inexpensively mass-produced with practical tolerances.

Thus the beam emitted from the output end 23 first passes through the negative lens 26 which functions to diverge the initially collimated beam. Then, the divergent beam impinges the mirror 26', and is thereupon reflected laterally to impinge the mirror 28, whereupon the beam is reflected upwardly to pass through the positive lens 30 which is operative to converge the divergent beam to a generally circular spot of approximately an 8 mil to 10 mil diameter at the reference plane.

The converging beam from the lens 30 impinges on the adjustable mirror 32, and is thereupon laterally reflected to a scanning mirror 44 which forms part of the scanning means.

The scanning means is preferably a high-speed scanner motor 46 of the type shown and described in U.S. Pat. No. 4,387,297, assigned to the same assignee as the present application. The entire contents of said patent are incorporated herein by reference and made part of this application. For purposes of this application, it is sufficient to point out that the scanner motor 46 has an output shaft 41 on which a support plate 43 is fixedly mounted. The scanning mirror 44 is fixedly mounted on the plate 43. The motor 46 is driven to reciprocally and repetitively oscillate the shaft in alternate circumferential directions over arc lengths of any desired size, typically less then 360 degrees, and at a rate of speed on the order of plurality of oscillations per second. In a preferred embodiment of this invention, the scanning mirror 44 and the shaft are jointly oscillated so that the scanning mirror repetitively sweeps the beam impinging thereon through an angular distance A or an arc length of about 25 degrees and at a rate of about 40 oscillations per second.

Stop means, i.e., an abutment 48, is fixedly mounted on a bracket 49 which is, in turn, mounted on the bench 24. The abutment 48 is located in the path of oscillating movement of the plate 43 for the scanning mirror 44, for preventing the mirror from making a complete 360 degree rotation during shipping. The abutment never strikes the mirror during scanning; the abutment serves to keep the mirror properly aligned, that is, always facing towards the front of the head.

The scanning motor 46 is mounted on the bench 24 slightly offset from the longitudinal axis. Other miniature scanning elements can be utilized. For example, miniature polygons driven by motors can be used, or the various bimorph scanning oscillation elements described in U.S. Pat. No. 4,251,798 can be used, or the penta-bimorph element described in U.S. Pat. No. 4,387,297 can be used, or the miniature polygon element described in U.S. Pat. No. 4,369,361 and assigned to the same assignee as the present application, the entire contents of which are hereby incorporated herein by reference and made part of this disclosure, can be used. Although only a single scanner element is shown in the drawing for cyclically sweeping the laser beam across the symbol along a predetermined direction (X-axis scanning) lengthwise hereof, it will be understood that another scanner element may be mounted in the head for sweeping the symbol along a transverse direction (Y-axis scanning) which is substantially orthogonal to the predetermined direction. In some applications, multiple line scanning is preferred.

Referring again to FIGS. 1 and 2, the scanning mirror 44 is mounted on the light path of the incident beam at the rear region 18 of the head, and the motor 46 is operative for cyclically sweeping the incident beam through an angular distance A over a field of view across the bar code symbol located in the vicinity of the reference plane. A laser light-transmissive scan window 50 is mounted on the raised rear region 18, behind an opening 51 formed therein in close adjacent confronting relationship with the scanning mirror 44 thereat. As used throughout the specification and claims herein, the term "close adjacent confronting" relationship between components is defined to mean that one component is proximally located relative to the other component, typically less than one inch apart of each other. As shown in FIG. 1, the scan window 50 is configured and positioned in the light path of the incident beam to permit the latter coming from the scanning mirror 44 to travel a distance of less than one inch within the raised rear region 18, and then to pass through the scan window 50, and thereupon to travel unobstructedly and exteriorly of and past the intermediate body region 20 and the front region 16 of the housing, and then to impinge on the symbol 103 located at or near the reference plane.

The closer the scanning mirror 44 is to the scan window 50, the larger will be the field of view of the swept incident beam for a given scan angle. As will be noted that the width dimension of the scan window represents a limiting factor of the sweep of the incident beam, because the housing walls bounding the scan window would clip and block any beam which was swept beyond the width of the scan window. Hence, as a rule, the scanning mirror is made as close as possible to the scan window to optimize the field of view of the swept incident beam.

We turn next to the surveillance tag deactivator of the present invention. As we have noted above, various types of electronic article (EAS) surveillance systems are known. Such systems are used for a variety of applications, such as preventing shoplifting and similar unauthorized removal of articles from a controlled area. More particularly, such systems provide a specially designed tag or label which is attached to the article. The tag or label contains active or passive electronic circuitry or a magnetic media which has at least two states: an active state and a deactivated state. The tag is designed to be responsive in a certain manner to the presence of an external electromagnetic field. The system is designed so that when the article containing a tag or label in the activated state is passed through a controlled exit, an alarm will be set off. If the tag or label is deactivated, no alarm will be triggered, and the article may be removed from the control area. In order to authorize the removal of the article from the control area, the tag or label must be either removed or deactivated by an authorized person. The present invention relates to surveillance systems that require deactivation of the tag, and more particularly to apparatus for deactivating a surveillance tag for authorized removal from the area.

From a marketing standpoint, there are three basic technologies that may be used in a disposable EAS tag: magnetic, intermediate RF, and microwave. The magnetic technique is believed the least reliable and works to about three feet although such system are operable at 10 times lower power than other configurations. The intermediate RF band is workable to about six feet. The microwave technique is useful at the twelve to fifteen foot range, suitable for the exits required for large department stores.

In one surveillance system, sensor-emitter labels or tags contain a semiconductor diode and are applied to articles for the purpose of surveillance. For deactivating such tags, various devices are known in the prior art including, among others, radio frequency generators for burning out the diode. However, such generators are generally high powered and are coupled inductively to the tags by way of an R. F. field.

Another surveillance system involves the use of tags containing ferrite material that can be magnetized or demagnetized by a suitable magnetic field. When the tag is moved into the magnetic field, the field alters the operating characteristic of the tag, thereby deactivating it. Note that a simple ferrite magnet is adequate to deactivate a magnetic tag by rebiasing a tag in its loop.

Another type article surveillance system is based on surface acoustic wave technology. Such systems include a tag with a tiny chip made of lithium niobate, a remote interrogation unit and reader that includes a radio frequency transceiver, and a computer interface unit to perform signal processing, multiplexing and communications to a host computer.

Lithium niobate is extremely efficient in the conversion of electromagnetic energy (from the radio signal) into surface acoustic waves. A high resolution photolithographic masking process may be used to create individual codes so that numerous individualized tags may be manufactured. When the radio waves strike the tag, a phase modulated signal is sent back to the reader that carries the equivalent of a binary number of up to 28 bits or more.

The small, lightweight tag can be configured in many different ways, making it easy to attach or insert in a variety of objects. The tag is also reusable, reliable and inexpensive. One of the main advantages of a lithium niobate tag is that it can be read through any non-conductive substance such as wood, concrete and asphalt. Another superior feature is its reading range, which can be up to six feet.

The interrogation unit continually transmits a 915 MHz radio frequency signal at a power of one to three milliwatts. This very low power signal is used to excite a lithium niobate crystal in the tag, which has no power of its own, but does have a small antenna. The excitation of the crystal creates a surface acoustic wave effect that alters the original signal in a manner unique for each tag. This new unique signal is echoed back and received by the reader, which passes it to the computer interface. The computer interface decodes the signal, changes it from analog to digital, and sends it to the host computer.

Still another surveillance system utilizes a light sensitive element or switch in the tag. The device transmitting a deactivating signal generates a laser light beam which functions to deactivate the tag or label by changing the state of a semiconductor component disposed in the label in the path of the light beam.

The laser light beam may be the same beam as the scanning beam. The device on the tag may take a variety of different structures: it may be a switch, such as the Auston switch, or may be a transistor device, such as a FET. The light beam may "blind" the FET so as to switch it into another state, representing a deactivated state.

Another embodiment of the tag is to utilize the latch up effect found in CMOS semiconductor devices. The latch up effect is normally considered a disadvantage of such devices and various circuit techniques have been employed in order to overcome such an effect. When a semiconductor device is latched up it remains in a single state because of the presence of charge carriers in a circuit element of the device. The same effect can be utilized to an advantage in an EAS tag allowing the laser beam or external electric field to cause the semiconductor device to latch up. Once the device is latched up, the EAS tag may be considered deactivated and no subsequent exposure to additional laser light or external field will change the state back to an activated state.

Another embodiment of the surveillance tag according to the present invention is a laser-activated microwave semiconductor device. The device consists essentially of back-to-back metal/thin oxide/silicon (MTOS) capacitors an a silicon chip.

Light from a laser (which may be a semiconductor laser) associated with the scanner would be directed at the surveillance tag. The light would be absorbed through the thinned areas of the aluminum electrodes of the capacitors The aluminum is less than 10 nm thick in these areas. A layer of silicon dioxide about 10 nm thick under the electrodes provides a large capacitance per unit area, and this capacitance is coupled to the capacitance of the depletion layer in the silicon beneath the oxide. The oxide is thick enough to be nonconducting at a voltage below 7 volts on one capacitor.

Operation of the device is based on the change in carrier-generation rate in the depletion layer caused by illuminating the MTOS capacitors. When illuminated by the laser, the depletion layer generates enough carriers to become conducting; the path between capacitor electrodes turns on very rapidly (equal to the product of the voltage and the depletion layer capacitance). When the device is illuminated with a laser pulse, the capacitance increases to one-half the capacitance of the oxide layer, which is quite large. The charge increases proportionately, creating a current pulse along a strip line on the chip surface.

The capacitors can also be made to function as capacitively-coupled back-to back photodevices. In this mode of operation, the device responds to low light levels with an estimated pulse response of 45 ps full width at half maximum.

The present invention is not limited to the use of any particular one of the EAS systems described, and the description that follows is intended to be generic. The deactivating module 100 is shown in the head 10 in FIG. 1. When enabled, the deactivating module will transmit a signal to the tag 101 which will change a physical characteristic of the tag so that the tag is deactivated and the purchaser of the article 102 is able to remove the article 102 from the controlled premises without setting off an alarm. In the figure, an embodiment of the tag 101 is shown in which the bar code symbol 103 actually forms a part of the portion of the tag that is responsive to the transmitted signal, i.e. finger-like structure representing an antenna or circuit in the tag. Further examples of circuitry on the tag 101 will be described subsequently.

The operation of the optical scanning device in conjunction with a deactivation module in a retail application may be described as follows. The article to be purchased is presented to the check-out station with the label 101 facing the scanner 10. The sales clerk positions the article 102 so that the scanner is able to read a bar code symbol 103 on the label. The manually activatable trigger switch 76 is utilized in the present invention to selectively initiate scanning and/or to transmit a deactivating signal to the surveillance tag. There are several different embodiments contemplated by the present invention:

In the first embodiment the switch 76 is a two position switch. The first position corresponds to the function of initiating the scanning and the second position corresponds to the function of deactivating the surveillance tag. The user has the option of scanning alone, or deactivating the tag alone by pressing the switch to position number 1 or position number 2 respectively. An alternate use of such a two position switch by a user would be to first initiate scanning, and after it has been determined that a successful decode has taken place (by a audible beep), the user can initiate deactivation by moving the switch to the second position. Successful deactivation may be indicated by an audible beep of a different tone.

A second embodiment of the present invention consists of utilizing the trigger switch to either initiate scanning or to initiate deactivation. Only upon successful completion of the selected function (i.e., by means of a successful decode or an indication that deactivation has been successful), will the scanner automatically execute the second function, that is, either deactivating or scanning. The signals representing the data or information represented on the symbol is transferred to the computer 70 for accounting, inventory, and record-keeping purposes.

The deactivating module 100 is represented in FIG. 1 in highly diagrammatic form as including a control circuit 105 and an antenna 106. In the embodiment shown in FIG. 1, it is assumed that the tag is deactivated by generation of a radio frequency field, such as would be generated by the antenna 106. The control circuit 105 is preferably coupled to the signal processing means 55 which processes the analog signal generated by the sensor means 54 to determine if a bar code symbol has been detected. There are various approaches to enabling the deactivating module, depending on whether or not a valid bar code signal has been detected.

The signal processing means 55 may process the electrical signal to determine whether the reflected light of variable intensity is indicative of the presence of a predetermined indicia pattern such as a bar code symbol. The signal processing means 55 may further include means for generating an enable signal when the reflected light of variable intensity is indicative of the presence of predetermined indicia pattern such as a bar code symbol. A deactivating signal will be transmitted to the label in response to the enable signal.

The deactivation of a surveillance tag may take any number of forms, and depending on the type of tag, the deactivation signal changes some physical aspect of the tag which deactivates it. U.S. Pat. No. 4,318,090 is herein incorporated by reference to describe one embodiment of a specific type of tag 101 and the technical procedure utilized in changing a state of the tag. Of course, other types of tags and other surveillance systems are also within the scope of the present invention.

For example, one simple surveillance system utilizes a tag containing a magnetic stripe. The magnetic stripe is demagnetized when the article is charged or checked out. Deactivation of the stripe occurs on command from the computer 70 after it is determined that the check-out has been authorized. Failure of the user to deactivate the stripe before taking the article from the controlled area will initiate an alarm at the exit. More sophisticated surveillance systems will provide a unique code for each article or class of articles so that the detection system will actually be able to identify the article. Such sophisticated systems may also include software which enables verification and confirmation messages to be printed or displayed by an on-line printer or display to enable the checkout clerk to authorize the transaction. In special applications, such as a rental agency or library, the print out message may include the user's identification or credit card number, the description of the article or item rented, the date charged, and the date due. If a reservation has been made the display will verify the reservation by user identification number, the article or item reserved and the date that the reservation or hole request was entered.

Our approach in the preferred embodiment of the present invention is to process the electric signal generated by the sensor means 54 to determine whether the reflected light represents a bar code, a specific category or class of bar codes, or even a bar code with a specific code. A description of the signal processing means 55 will be presented in detail at a later point. If a bar code symbol is detected (or other predetermined criteria is satisfied), an enabling signal will be generated by the signal processing means 55 and applied to the control circuit 105. The control circuit switches current into the antenna 106 in response to the enabling signal, thereby generating a radio frequency field which, when placed sufficiently close to the tag 101, will deactivate the tag 101.

Returning to the description of the scanning component of the present invention, as best shown in FIG. 2, the field of view of the swept incident beam is substantially independent of the width of the body portion 14 and, in fact, the field of view, i.e., the transverse beam sweep dimension, of the swept incident beam is actually larger than the width of the body portion 14 at the front region 16 and at the forward section of the intermediate body region 20. This is, of course, enabled by the fact that the swept incident beam has been transmitted outside of the front and intermediate body regions of the housing. The side walls 15, 17 are not in the light path and do not clip or block the swept incident beam. The scan window 50 is mounted on the rear region 18 at an elevation above the top wall 11 to permit an overhead unobstructed transmission.

In a preferred embodiment, the reference plane is located about 2 inches from the front wall 19 of the head, and is located a linear distance of about 9½ inches from the positive lens 30. The depth of field at the reference plane is about 2¾" on either side of the reference plane. These numerical figures are not intended to be self-limiting, but are merely exemplary.

A light-transmissive non-scan window 52 is mounted on the front wall 19 in close adjacent confronting relationship with the sensor means 54 located at the front region 16. The sensor means 54 is operative for detecting the intensity of the light in the reflected beam coming from the symbol over a field of view across the same, and for generating an electric analog signal indicative of the detected light intensity. In order to increase the zone of coverage of the sensor means, a pair of sensor elements or photodiodes 54*a*, 54*b* are located on opposite sides of the longitudinal axis. The sensor elements lie in intersecting planes and face both forwardly and laterally. The front wall 19 is likewise constituted of a pair of tapered wall portions 19*a*, 29*b* each of which has an opening 53*a*, 53*b* formed therein. A pair of non-scan window portions 52*a*, 52*b* is fixedly mounted behind the openings 52*a*, 52*b*, respectively. Each non-scan window portion is mounted in close adjacent confronting relationship with its respective sensor element. The non-scan window portions are configured and positioned in the light path of the reflected beam to permit the latter to pass therethrough to the sensor elements. Two small non-scan window portions are preferably utilized, rather than a single non-scan window, because two smaller windows are inherently stronger than one due to the greater perimeter that two windows provide.

The scan window 50 is located rearwardly of the non-scan window 52. Each window 50, 52 is located at a different distance from the reference plane and the front wall 19. The scan window 50 is elevated above the non-scan window 53 as described above. The non-scan window portions are located at opposite sides of the longitudinal axis. The scan window is located on the longitudinal axis.

A printed circuit board 59 is mounted within the body portion 14, and various electrical sub-circuits diagrammatically represented by reference numerals 55, 56, 57, 58 are provided on the board 59. Signal processing means 55 is operative to process the analog signal generated by the sensor to a digitized signal to generate therefrom data descriptive of the bar code symbol. Suitable signal processing means for this purpose was described in U.S. Pat. No. 4,251,798. Sub-circuit 56 constitutes drive circuitry for the scanner motor 46. Suitable motor drive circuitry for this purpose was also described in U.S. Pat. No. 4,387,297. Sub-circuits 57 and 58 constitute a safety circuit for the laser tube, and voltage regulator circuitry. Suitable circuitry for this purpose was also described in U.S. Pat. No. 4,387,297.

Shock mounting means are mounted at the front and rear regions of the body portion, for shock mounting the laser, optical and scanning components within the body portion. An annular shock collar 60 preferably of rubber material, surrounds the forward end of the tube 22 and engages the bottom wall 13 and the underside of the circuit board 59. Board support elements 61a, 61b, extend downwardly of the top wall 11 to rigidly support the circuit board 59. A pair of rubber shock mounts 62, 64 are fixedly mounted on opposite sides of the optical bench 24, and respectively engage the side walls 15, 17 at the rear region 18 of the housing. The shock mounts 62, 64 and the collar 60 are spaced longitudinally apart of each other and engage the thin-walled housing at three spaced locations to isolate twisting of the housing from the laser, optical and scanning components.

Electrical power is supplied to the laser tube 22 and the deactivation module 100 by the power supply component 40 mounted within the handle portion 12. The power supply component which steps up a 12 DC battery voltage to over 1 kilovolt is the heaviest component in the head, and its mounting in the handle portion allows for a low center of gravity and for better balance of the head. In the embodiment in which a semiconductor laser is used, such a massive power supply component would not be necessary.

A non-bulky, collapsible, coil-type cable 66 (see FIG. 5) electrically connects the head 10 to the remainder of the scanning system, which includes a battery-powered decode module 68 and a host computer 70. The coil-type cable 66 is readily flexible and permits user manipulation of the head 10 with multiple freedoms of movement from one symbol to the next without requiring excessive strength by the user. The cable 66 includes a plurality of conductive wires which are all relatively thin and flexible. For example, one wire carries the 12 v DC low voltage signal from the battery in the decode module 68 to the power component 40. Another wire carries the digitized signal from the analog-to-digital signal processing circuitry 55 to the decode module 68 for decoding purposes. This latter wire is non-radio-frequency-shielded, and hence is readily flexible. The remaining wires carry low voltage control and communication signals. All of the wires of the cable 66 are connected together to a common plug-type connector 72. A mating connector 74 is mounted within the head and receives the connector 72 in a mating relationship. The use of the mating connectors 72, 74 permits rapid replacement of the cable for on-site repairs. The electrical connections between the connector 74 and the various components in the head have been omitted from the drawing for the sake of clarity.

Figure 5:
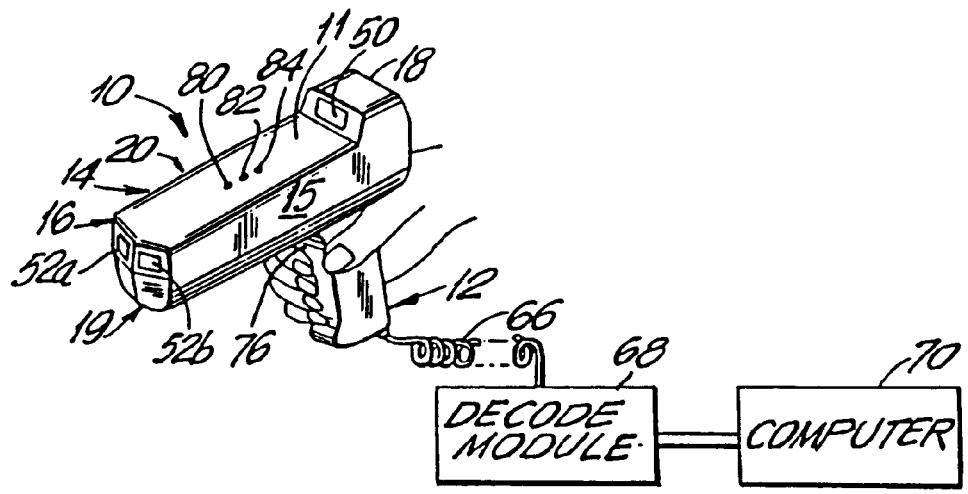
FIG. 5 is a front perspective view of the FIG. 1 embodiment, on a smaller scale, that diagrammatically shows the interconnection of the head to the remainder of the scanning system.

As shown in FIG. 5, the decode module 68 processes the digitized signal generated in the head, and calculates the desired data, e.g., the multiple digit representation or code of the bar code symbol, in accordance with an algorithm contained in a software program. The decode module 68 includes a PROM for holding the control program, a RAM for temporary data storage, and a microprocessor which controls the PROM and RAM and does the desired calculations. The decode module also includes control circuitry for controlling the actuatable components in the head as described below, as well as two-way communications circuitry for communication with the head and/or with the host computer 70. The host computer 70 is essentially a large database, and provides information for the decoded symbol. For example, the host computer can provide retail price information corresponding to the decoded symbols.

A manually-actuatable trigger switch 76 is mounted on the head in the region where the handle portion 12 is joined to the body portion 14. Depression of the trigger switch 76 is operative to turn the microprocessor in the decode module on. Upon release of the trigger switch, the spring 78 restores the switch to its initial position, and the microprocessor is turned off. In turn, the microprocessor is electrically connected to the actuatable components in the head via the cable 66 to actuate and deactuate the actuatable components when the microprocessor is respectively turned on or off by the trigger switch.

The trigger switch turns the microprocessor on or off and, may also be used to turn all of the actuatable components in the head on or off, including the deactivating module 100. Thus, deactivation of the tag in such an embodiment may be achieved by depressing the trigger. The microprocessor is a large power drain on the battery built in the decode module. Hence, by controlling the on-time of the microprocessor to only those times when a symbol is being read, that is, when the trigger switch is depressed, the power drain is substantially reduced, and the battery line substantially increased (over 5 hours).

Another feature of one embodiment of this invention is embodied in turning the microprocessor on or off by means of the host computer 70 which is remote from the head 10. The computer 70 typically includes a keyboard and a display. Once a user makes an entry on the keyboard, for example, by entering the identity of the code to be decoded, the computer requests the microprocessor to turn itself on, to store the information, and then to turn the microprocessor off. The microprocessor, again, is only on for so long as is necessary to comply with the computer request. The trigger switch and the keyboard computer entry are independently operable means for directly controlling the actuatable components in the head.

Another useful feature in having the microprocessor, rather than the trigger switch, directly control the light source is,in the case of a laser, to keep an measurement record of laser on-time in order to comply with regulatory requirements. It is, of course, far easier to keep track of laser on-time in the software of a microprocessor than to manually record the laser on-time.

A set of visual indicators or lamps 80, 82, 84 is also mounted on the circuit board 59, each lamp being positioned below a corresponding opening in the top wall 11. The lamps are operative to visually indicate to the user the status of the scanning system. For example, lamp 80 illuminates whenever the laser tube is energized, thereby continuously advising the user whether the tube is on or off. Lamp 82 illuminates when a successful decode has been obtained. It will be recalled that the incident beam is swept over a symbol at a rate of about 40 scans per second. The reflected beam may be successfully decoded on the first scan, or on any of the successive scans. Whenever a successful scan has been obtained, the microprocessor will cause the lamp 82 to be illuminated to advise the user that the head is ready to read another symbol. Lamp 84 may be illuminated when a successful tag deactivation has occurred, such as indicated by a return signal from the tag.

It is believed that the operation of the scanning system is self-evident from the foregoing, but by way of brief review, the gun-shaped head is grasped by its handle portion, and its barrel is aimed at the bar code symbol to be read. The pointing of the barrel in the general direction of the symbol is facilitated by the fact that the barrel is narrow-bodied, and that there are no obstructions on the front and intermediate body regions of the barrel. The front wall of the barrel is typically situated close to the symbol, it being understood that the symbol can be located anywhere in the depth of field at either side of the reference plane.

The trigger switch is then depressed, thereby causing the microprocessor to energize the laser tube or light source, the scanner motor, the sensor elements, and all the electronic circuitry provided on the printed circuit board. The light source emits a beam which is then routed through the optic train as described above, and thereupon, the scanning mirror reflects the beam through the scan window and out of the head exteriorly of and past the front and intermediate body regions of the body portion of the head. The reflected beam passes through the non-scan window portions to the sensor elements and is subsequently processed by the signal processing circuitry. The processed signal is conducted to the decode module for decoding. Once a successful decode has been realized, the microprocessor illuminates the lamp 82. If the trigger switch is pulled to its second position, a deactivation signal will be generated. Once the tag has been deactivated, the lamp 84 will illuminate. The user is now advised that the head is ready to be aimed at another symbol. The flexibility of the coil-type cable facilitates the movement of the head to the next symbol.

In addition, the movement of the head from one symbol to the next is facilitated by the relatively low weight of the head. The head with all the aforementioned components therein weighs less than one pound.

Figure 6:
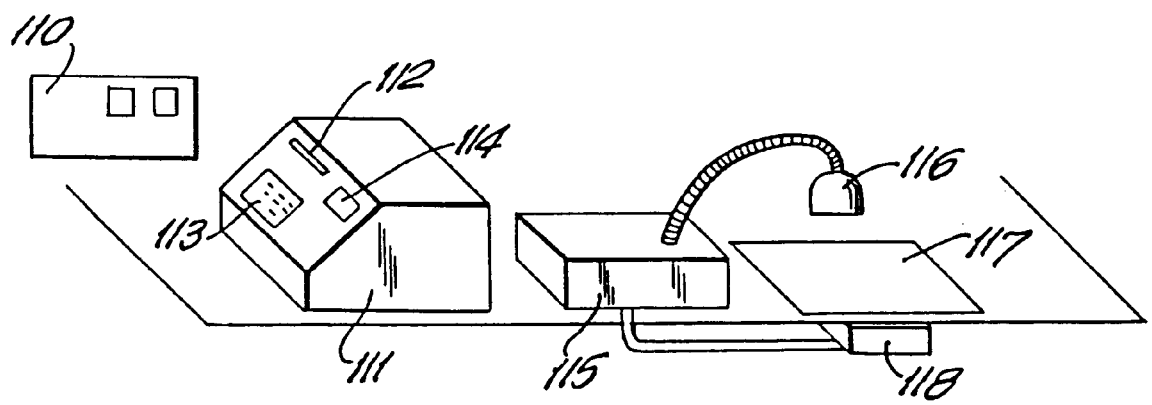
FIG. 6 is a highly simplified perspective view of a point-of-sale system incorporating another embodiment of the present invention.

FIG. 6 illustrates another embodiment of the present invention in a point-of-sale terminal that includes a table-top directional optical scanner for multidirectionally scanning a light-reflecting target, such as an article including a bar code symbol on the surface. The articles are placed on a table-top within the field of view of a detector and a multidirectional scan pattern is generated that permits the scanner to read the randomly-oriented bar code symbols.

The figure shows a point-of-sale terminal 111 including a card reader 112, a keyboard 113, and display 114. A scanner including a base 115 and a scanning head 116 is coupled to the terminal 111 and functions to read bar code symbols on articles placed on field of view plane 117. A credit card or "smart card" 110 may also be used in connection with the terminal 111 so that the customer's purchases as read by the scanning head 116 may be automatically paid for by the customer through use of a credit card or cash card. The system further includes a deactivation unit 118 which is coupled to the base 115 of the scanning head 116.

There are a number of possible scanning modes that we are considering in connection with stand mounted laser scanners: (a) the normal triggered mode; (b) the triggered spot and scan mode; and (c) the dual position trigger mode according to the present invention.

In the normal triggered mode, the laser beam is normally off. An "object scanner" is used in the normal triggered mode with a stand mounted scanner to detect the presence of an object in the field of view of the scanner and to initiate the rapid and repetitive scanning of the target symbol. For proper counting, it is necessary to distinguish between the situation in which many scans have been performed on a single object, or the situation in which one or more scans have been performed on a plurality of objects with identical symbols. The capability of sensing each object to be scanned in its turn is critical for successful applications of bar code scanning in data collection, inventory, and the like.

As is known in prior art hand held scanners (such as described in U.S. Pat. No. 4,387,297), a trigger or its equivalent is operative for actuating the scanning means to repetitively sweep the bar code symbol a number of times each time the trigger is actuated. In a hand-held unit, the trigger is preferably a manually-depressible switch mounted on the housing in the vicinity of the interconnection of the barrel and handle portions of the housing. The trigger switch is located on the handle portion such that the forefinger of the user's hand can be used to manually depress the switch. Each time the switch is depressed the scanner sweeps the symbol many times, until a complete decode or a time out is reached. In a stand mounted unit, a two position switch (not shown) could be used. A key on the keyboard 113 could perform the same function, but we will use the single term "switch" for simplicity.

The first position of the switch corresponds to the function of initiating the scanning and the second position corresponds to the function of deactivating the surveillance tag. The user has the option of scanning alone, or deactivating the tag alone by moving the switch to position number 1 or position number 2 respectively. An alternate use of such a two position switch by a user would be to first initiate scanning, and after it has been determined that a successful decode has taken place (by a audible beep), the user can initiate deactivation by moving the switch to the second position. Successful deactivation may be indicated by an audible beep of a different tone.

In the triggered mode, when the decode circuitry successfully decodes the symbol, the decode circuitry generates a successful decode signal and may actuate the indicator located in the scanner. The indicator may be an auditory-type beeper and/or a light emitting diode. When the beeper sounds and/or when the diode lights up, then the user knows that the scanning for that particular symbol has been terminated.

In the triggered spot and scan mode, as described in U.S. Pat. No. 4,933,538, after the object sensor determines the presence of an object, the beam comes on at a narrow angle. In such an operational mode, a very bright, short line about 1 inch in length is formed by the laser narrow scanning beam. The bright small line is used by the user to move the label under the line so that the bar code may be read. When an indicia pattern indicative of a bar code symbol has been detected, the beam will widen thereby sweeping the entire symbol so that it can be decoded.

In the dual position spot and scan mode, according to the present invention, after the object sensor detects the presence of an object and is set to a first position, the beam is directed in a fixed, non-scanning path. In such an operational mode, a very bright spot about 240 microns in diameter (at about 3½ inches from nose) is formed by the laser narrow scanning beam. The bright spot is used by the user holding the laser scanner to manually aim and direct the beam to the location where the user actually sees the bar code is located. Typically the user will position the spot approximately at the center of the bar code. The user will then activate the switch to a second position to initiate scanning. When the second position of the switch is reached, the beam will widen to sweep the entire symbol so that it can be decoded. Although in some cases the beam may be dimly reflective or not visible to the user, since the beam has already been positioned, the sweep will cover the symbol and decode will take place.

Although the embodiment shown in FIG. 6 is a table-top type scanning/deactivation unit, it may also be implemented in the form of a mobile shopping cart. In such embodiment, which is not shown in the drawing, the customer would wheel the cart through a merchandise, inventory, or material area. Upon selecting specific merchandise, the customer would scan the label, thereby deactivating it and meanwhile keeping a running tally of the amount charged.

As an example, consider the following technique. To charge an article to be purchased, a patron inserts his credit card into the reader 112 to be automatically read and verified against a data base containing the number of all valid account numbers. If the credit card number is not found in the file, the transaction will not proceed and the alphanumeric display unit 114 advises the user to consult with an authorized person. In the case of a mobile shopping cart embodiment, deactivation will not occur and the customer is prevented from removing merchandise. In any of these cases, a switch may be employed so that an authorized person has the capability to override the transaction if desired.

It will be understood that each of the elements described above, or two or more together, also may find useful application in other types of constructions differing from the types described above.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of the data acquisition system.

An individual module may have specific scanning characteristics associated with it, e.g. operability at a certain working distance, or operability with a certain density of symbols. The scanning characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, data storage application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

Figure 7A:
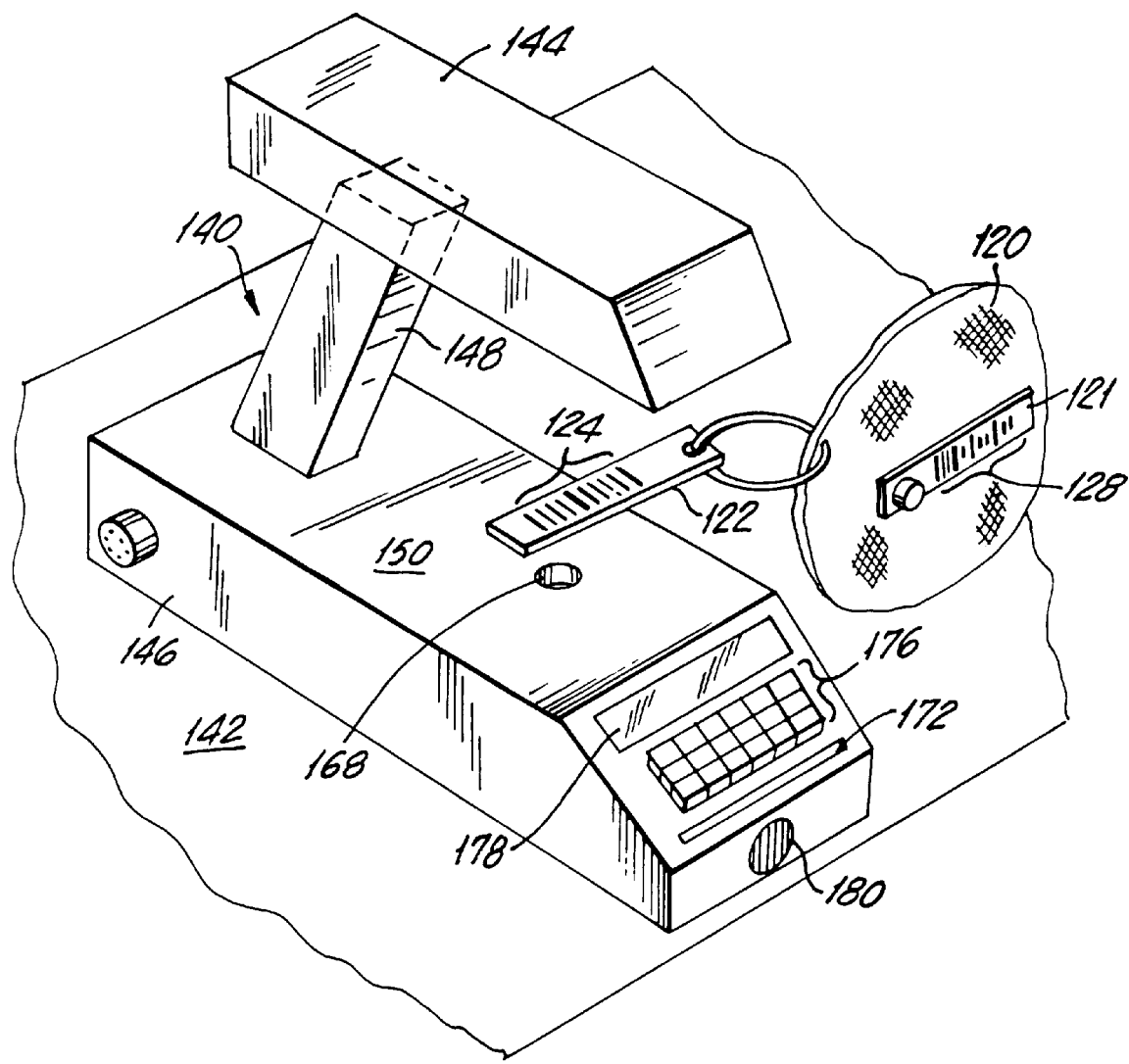
FIG. 7a is a perspective view of another point-of-transaction system according to still another embodiment of the present invention; which utilizes removable surveillance tags
Figure 7B:
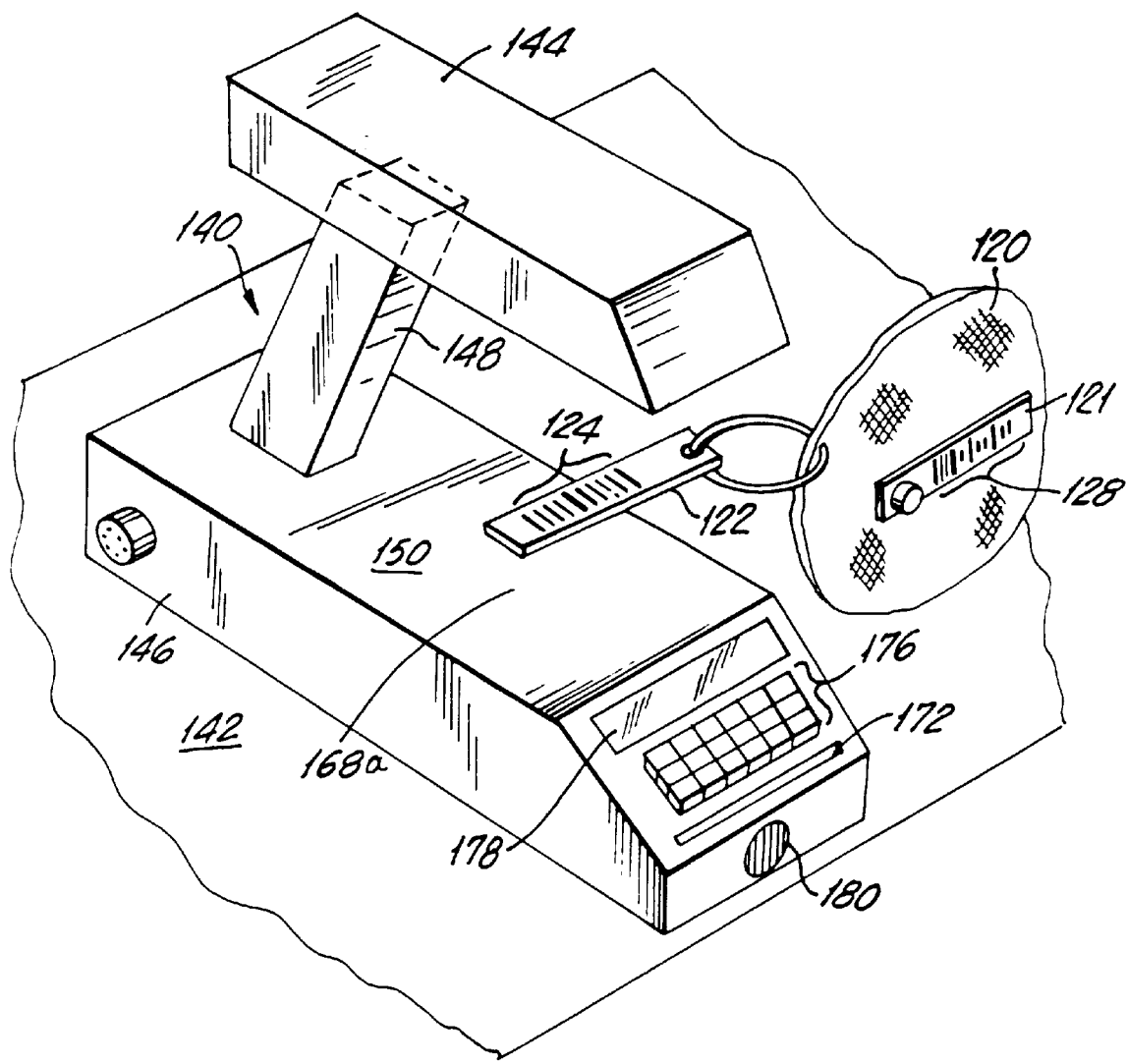
FIG. 7b is a perspective view of another point-of-transaction system according to still another embodiment of the present invention which utilizes deactivatable surveillance tags.

FIG. 7a illustrates another table-top, point-of-transaction system for processing articles bearing light-reflective, coded indicia identifying the articles. For example, a garment 120 bears a hang tag 122 on which a symbol 124 is printed.

Removably attached to the garment 120 is a surveillance tag 126 also bearing a light-reflective, coded indicium, such as a symbol 128 thereon. The symbol 128 identifies the tag and is preferably printed on the tag itself, or on a label permanently adhered to the tag. The symbols 124, 128 may be identical or different and, if different, may be sequentially numbered.

Figure 8A:
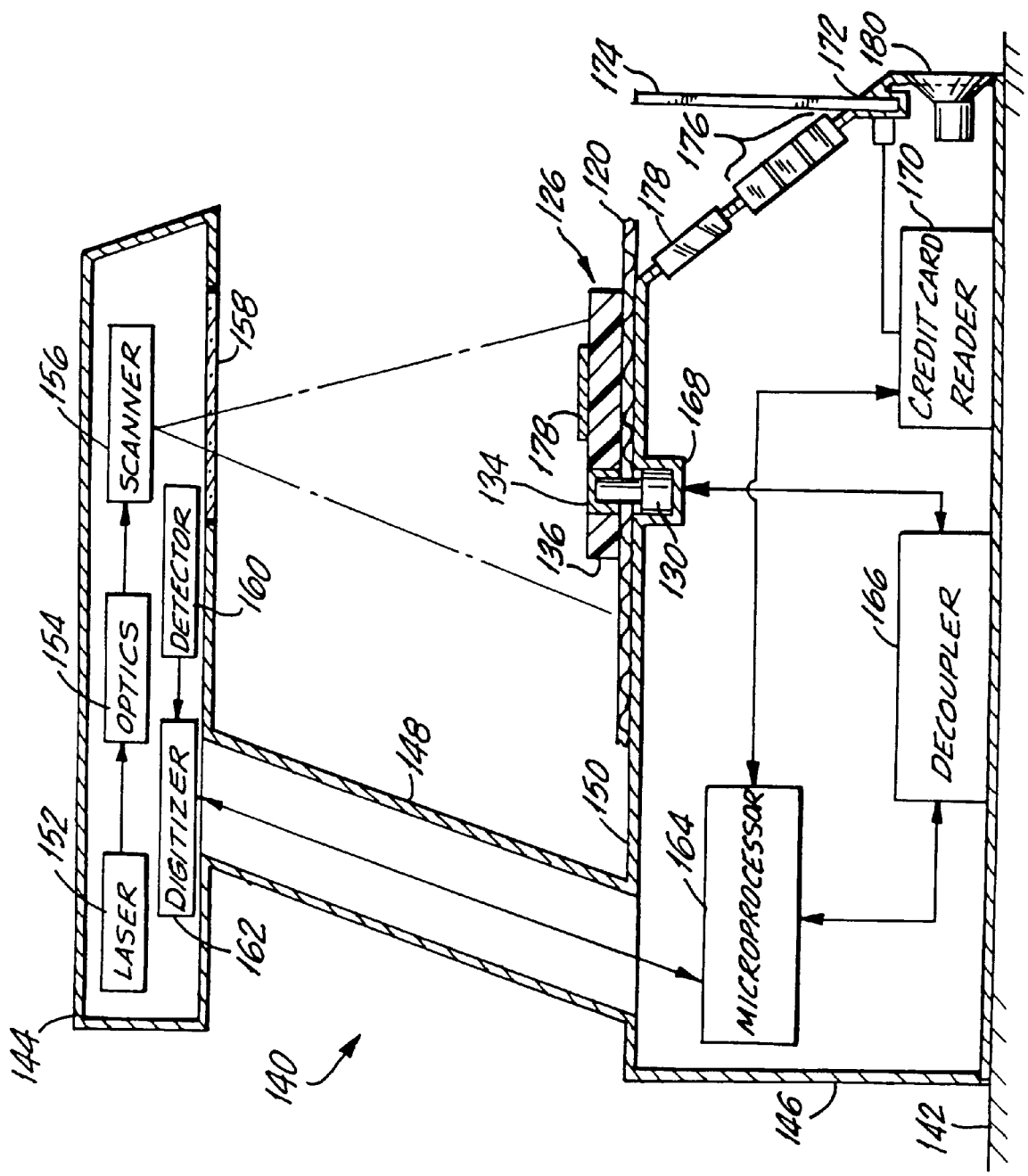
FIG. 8a is a side view of the system of FIG. 7a in block, diagrammatic form.
Figure 8B:
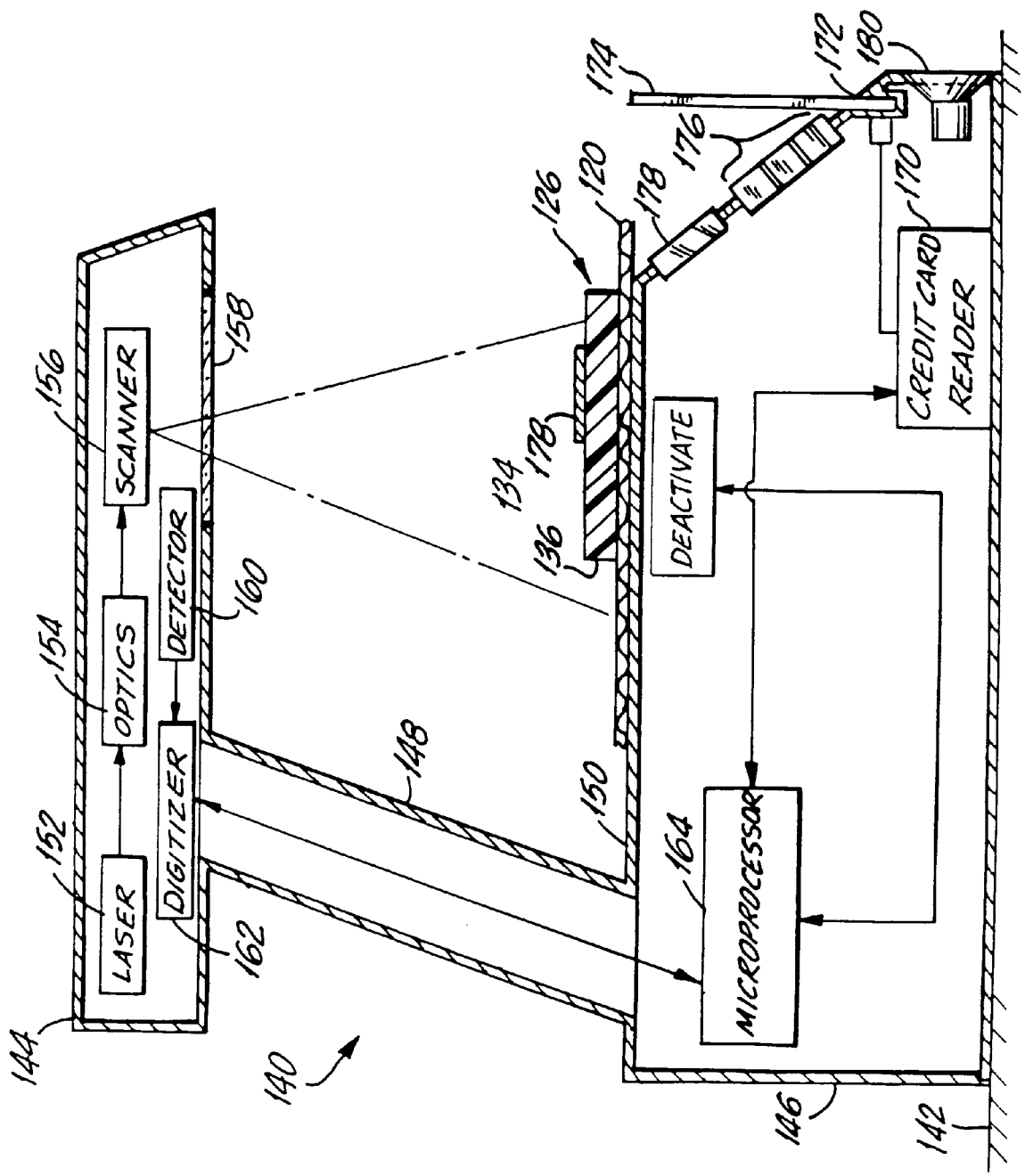
FIG. 8b is a sideview of the system of FIG. 7b in block, diagrammatic form.

As best shown in FIG. 8a, the tag 126 includes a pin member 130, a socket member 134 for receiving the pin member 130, and a plastic support 136 in which the socket member 134 is embedded and on which the symbol 128 (or a label bearing the symbol 128) is carried. The members 130, 134 are separable, typically by a magnetic decoupler 166 known, per se, in the art.

The FIG. 7a system includes a self-checkout terminal 140 supported on a countertop or like supporting surface 142. The terminal 140 includes an overhead housing 144, a base 146, and an upright 148 for supporting the housing 144 above the base 146. The base has an upper work surface 150 on and over which the symbols 124, 128 are successively passed underneath the housing 144.

As shown diagrammatically in FIG. 8a, the housing 144 has a laser source 152 for emitting a light beam, an optical train 154 for optically modifying and focusing the beam to a reading spot located in the vicinity of the work surface 150, a scanner 156 for scanning the light beam in a scan pattern over the work surface, an exit port 158 through which the beam passes exteriorly of the housing en route to the work surface, a detector 160 for detecting scattered light reflected off the symbol 124 or 128, a digitizer 162 for converting an electrical analog signal indicative of the detected light intensity of the scattered light to a digitized signal, and a control microprocessor 164 operative for decoding the digitized signal in accordance with a stored algorithm into data representative of the article or the tag. The control microprocessor 164 operatively connects to the decoupler 166 and selectively enables and disables the operation of the decoupler 166.

The base 146 contains the conventional decoupler 166 which is operatively connected to a well 168 extending into the work surface 150. A credit card reader 170, also known, per se, is also contained in the base 146 and is operatively connected to a slot 172 in which a credit card or analogous payment card 174 is inserted. The card typically supports a strip of magnetically-encoded data.

A manual entry keyboard 176 having numerical and function keys is provided on the base, together with a display 178 for displaying information and, as described below, for displaying prompting messages to a user. A speaker 180 may also be used for broadcasting auditory prompting messages.

Figure 9A:
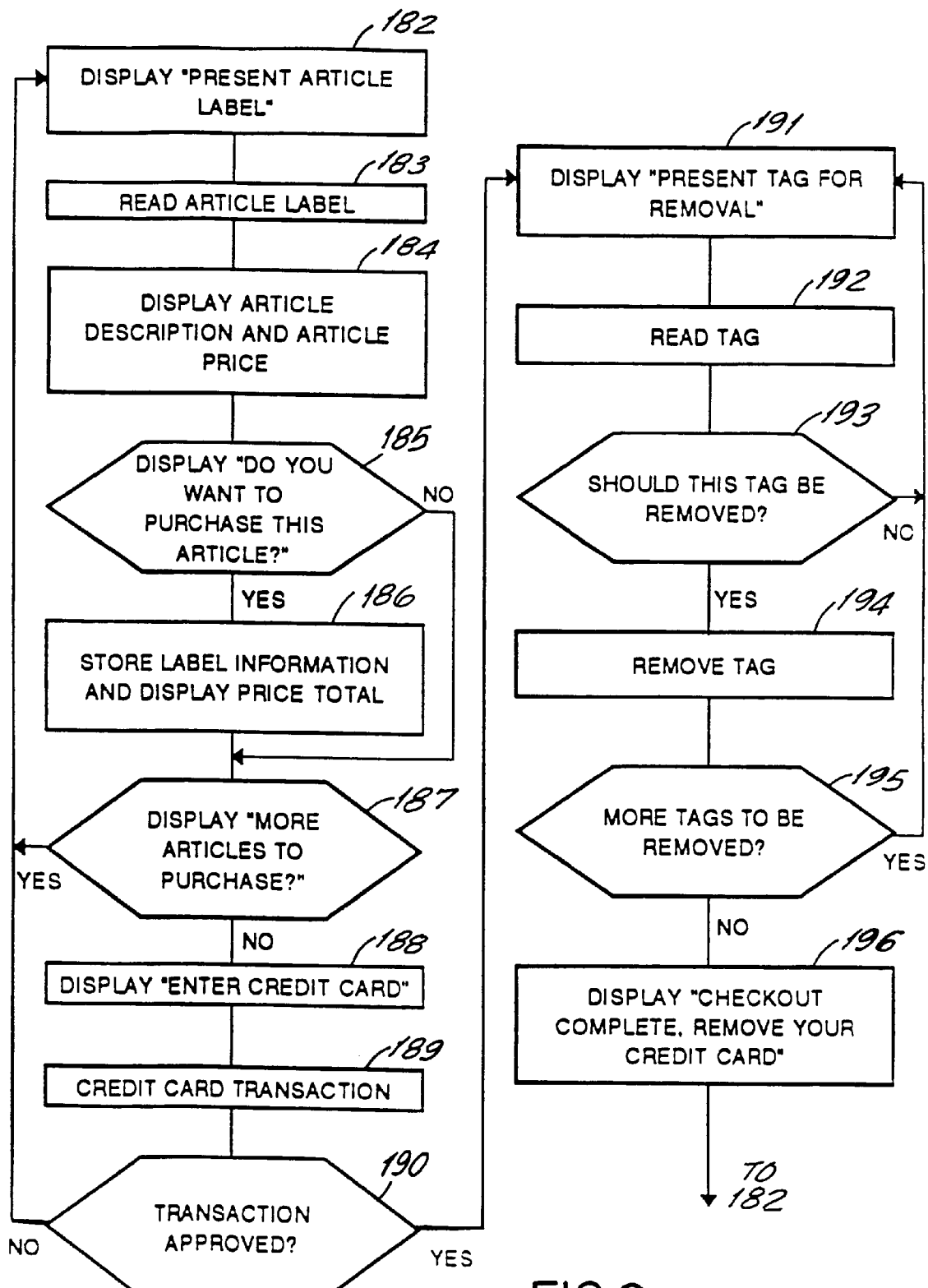
FIG. 9a is a flow chart depicting an embodiment of the operation of the FIG. 7a system.

A flow-chart illustrating a specific embodiment of the operation of a self-checkout system, in which only those surveillance tags attached to articles which have been purchased are permitted to be removed, is shown in FIG. 9a. For this embodiment, the symbol 128 on each surveillance tag 126 is formed on an attachable label and is selected to be the same as the symbol 124 on the corresponding hanger tag 122. A device is disclosed in U.S. Pat. No. 4,746,932, which is herein incorporated by reference, which allows a user to read a symbol (i.e., the symbol 124 on the hanger tag 122) and then prints on an attachable label a symbol identical to the symbol read. This attachable label, having symbol 128 printed thereon, is then attached to the surveillance tag 126.

Referring to FIG. 9a, at STEP 182, the message "PRESENT ARTICLE LABEL" is displayed on the display 178 so that a customer, upon approaching the terminal 140, will know that the terminal is available for use.

At STEP 183, when the customer passes the hanger tag 122 between the upper work surface 150 and the housing 144, the symbol 124 is read and decoded in the well known manner, and the decoded value thereof is stored in the microprocessor 164.

At STEP 184, the microprocessor uses the decoded value of the symbol 124 obtained in STEP 183 to interrogate a description and price database (not shown) to obtain the description and the price of the article 120 to which the hanger tag 122 is attached. The article description and price are displayed on the display 178.

At STEP 185, the message "DO YOU WANT TO PURCHASE THIS ARTICLE?" is placed on the display 178. If the user responds YES, by pressing a predetermined key on the keyboard 176, progress is made to STEP 186, where the decoded value of the symbol 124 is stored in memory (not shown) within the microprocessor 164 and the price of the article is added to a Running Total Price for this checkout sequence. The Running Total Price is displayed 178 so that the customer can see the total cost of all articles purchases. However, if the customer responds No at STEP 185, by pressing a predetermined key, progress is made to STEP 187.

At STEP 187, the message "MORE ARTICLE TO BE PURCHASED?" appears on the display 178. If the user responds YES, by pressing a predetermined key on the keyboard 176, the flow branches back to STEP 182 where the next article can be processed. If the customer responds NO, by pressing a predetermined key, progress is made to STEP 188 where the customer is instructed by the display 178 to "ENTER CREDIT CARD". When the customer's credit card 174 is entered into slot 172 the credit card reader 170 is activated.

At STEP 189 the credit card transaction for the Running Total Price is effected in the normal way. For example, the terminal 146 may communicate with a remote facility where the transaction is approved.

At STEP 190, if the credit card transaction is denied, an appropriate message is displayed to the customer apprising them of the denial and directing them not to remove the articles from the store. Since the surveillance tags 126 are still attached to the articles 120, attempts to remove the articles 120 from the store would be detected in the normal manner. If the credit card transaction is approved, progress is made to STEP 191.

At STEP 191, the display prompts the customer to present the surveillance tag 126 for removal by displaying the message "PRESENT TAG FOR REMOVAL".

AT STEP 192, the customer presents the surveillance tag 126 for removal by positioning the tag in a deactivation region (i.e., by inserting the pin member 130 of the tag into the well 168). The microcomputer detects the insertion of the pin member 130 by detection means (not shown), such as, for example, an optical switch, mechanical switch, hall effect switch, etc. Responsive to such detection, the microcomputer 164 activates the reader within the housing 144 to automatically read the symbol 128 on the surveillance tag 126. Alternative, the detection means can be eliminated and the customer can be required to press a predetermined key on the keypad 176 after the insertion of the pin member 130 into the well 168 is completed. Responsive to the predetermined key the microcomputer activates the reader. A step 193, the symbol 128 read in step 192 is compared with the symbols 124 of the hanger tags 122 previously stored in memory at STEP 186, and if a match is found, it is determined that the surveillance tag 126 is attached to an article 120 which has been properly purchased, and therefore, can be remove from the article. If no match is found, the article 120 has not been purchased, and therefore, the tag should not be removed and progress is made to STEP 191.

At STEP 194, the microcomputer 164 enables the decoupler 166 which in turn removes, or permits the customer to remove, the pin 130. Further, the microcomputer removes from memory one copy of the symbol 128 of the removed surveillance tag 126 so as to prevent a similar surveillance tag 126, attached to a similar article, from being removed. In this manner, only tags associated with articles which have been purchased can be removed from the articles.

At STEP 195, the microcomputer checks the memory to determine whether there are still symbols 124, which were stored in STEP 186, contained therein. If YES, progress is made to STEP 191 where more surveillance tags 126 can be removed.

At STEP 196, the surveillance tags 126 of all the article which were purchased have been removed. The customer is instructed "CHECKOUT COMPLETE, REMOVE YOUR CREDIT CARD".

As can be appreciated, in the system described in FIG. 9a, only those surveillance tags 126 attached to articles which have been purchased are permitted to be removed in STEPS 191–195. Accordingly, a customer who is using the self-checkout counter is prevented from removing surveillance tags 126 from articles other than those articles purchased. For example, if the customer purchases in STEPS 182–190 an article costing $20 (i.e., a shirt), the customer is prevented in STEPS 191–195 from purposely, or inadvertently, removing a surveillance tag from a more expensive article (i.e., a fur coat), which has not been purchase. As can be appreciated, a self-checkout counter, as described, can be operated by a customer as opposed to a store employee, thereby reducing the staffing requirements, while at the same time assuring that theft or inadvertent removal of articles which have not been purchased is prevented.

In the embodiment described with reference to FIG. 9a, the symbol 124 on the hanger tag 122 and the symbol 128 on each corresponding surveillance tag 126 are identical. However, in a further embodiment, each surveillance tag 126 is provided with an unique symbol 128 (i.e., when the surveillance tags 126 are manufactured an unique symbol 128 is printed on each). In this embodiment, after the hanger tag 122 and the surveillance tag 126 are attached to an article, the symbol 124 on each hanger tag 122, and the symbol 128 on each corresponding surveillance tag 126 are read and associated with each other, with such association being stored in a database (Conversion Database) (not shown) which can be accessed by the microcomputer 164.

Figure 9B:
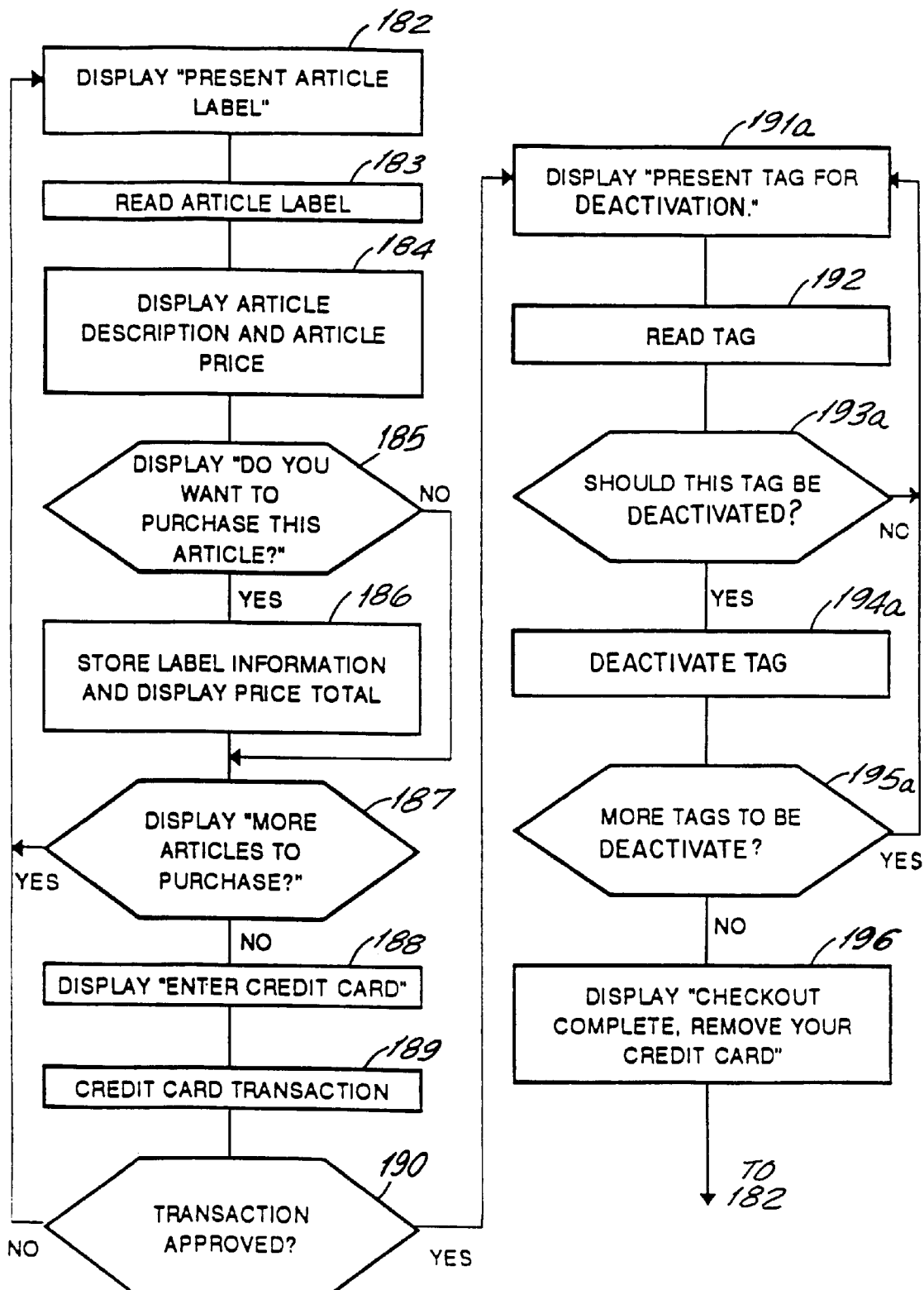
FIG. 9b is a flow chart depicting an embodiment of the operation of the FIG. 7b system.

In this embodiment, STEPS 182–192 and 194–196, as shown in FIG. 9, remain the same. However, STEP 193 is modified as follows.

At STEP 193, the symbol 128 read in STEP 192 is used by the microcomputer 164 to extract from the conversion database (not shown) the symbol which has been associated therewith. If the symbol 128 is not found in the conversion database, it is determined that this particular surveillance tag 126 should not be removed and progress is made to STEP 191. If an associated symbol is found in the conversion database, this associated symbol is compared with the symbols 124 of the hanger tags 122 previously stored in memory at STEP 186, and if a match is found, it is determined that the surveillance tag 126 is attached to an article 120 which has been properly purchased, and therefore, can be remove from the article. If no match is found, the article 120 has not been purchased, and therefore, the tag should not be removed and progress is made to STEP 191.

Figure 10A:
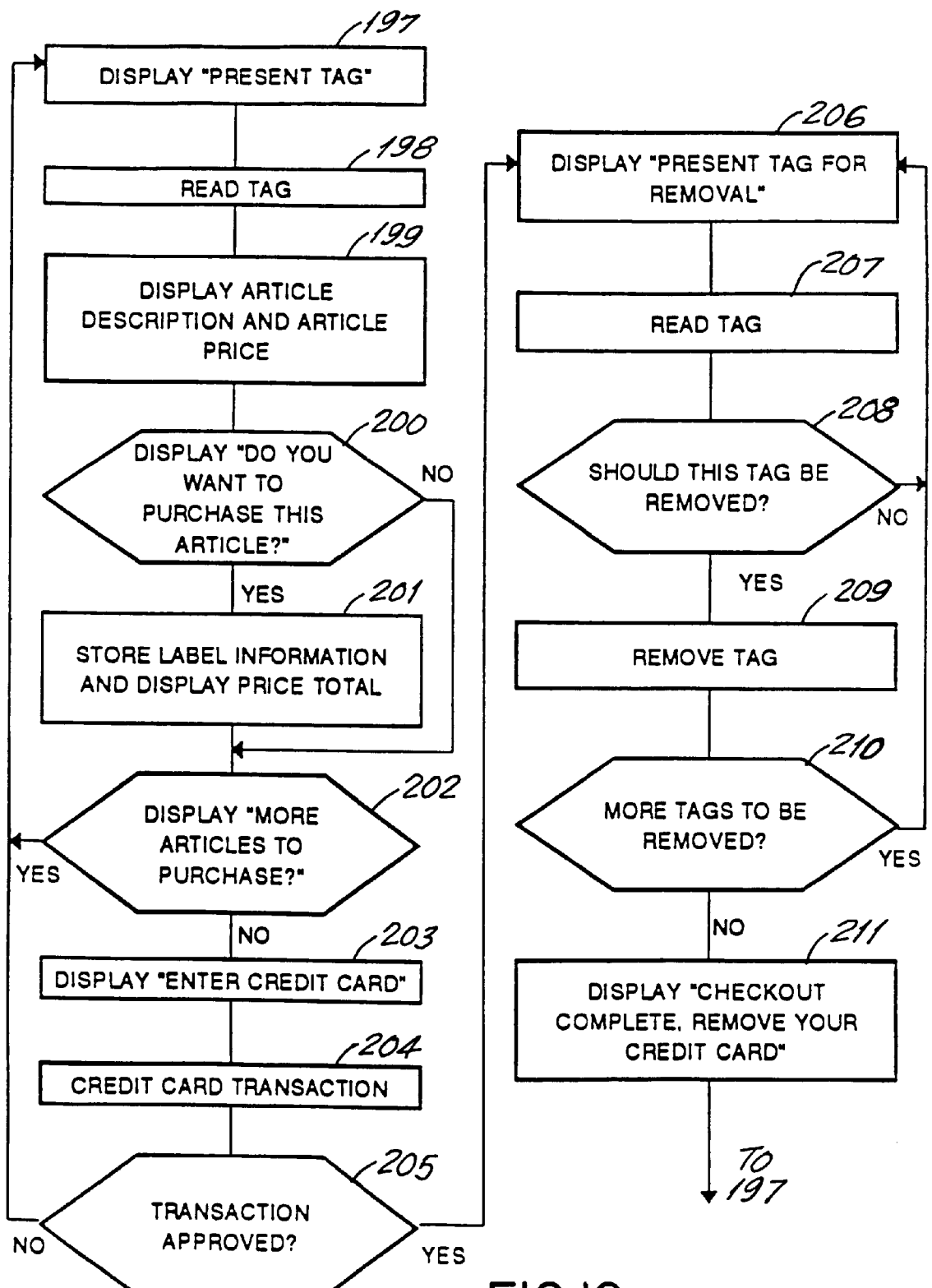
FIG. 10a is a flow chart depicting a further embodiment of the operation of the FIG. 7a system.
Figure 10B:
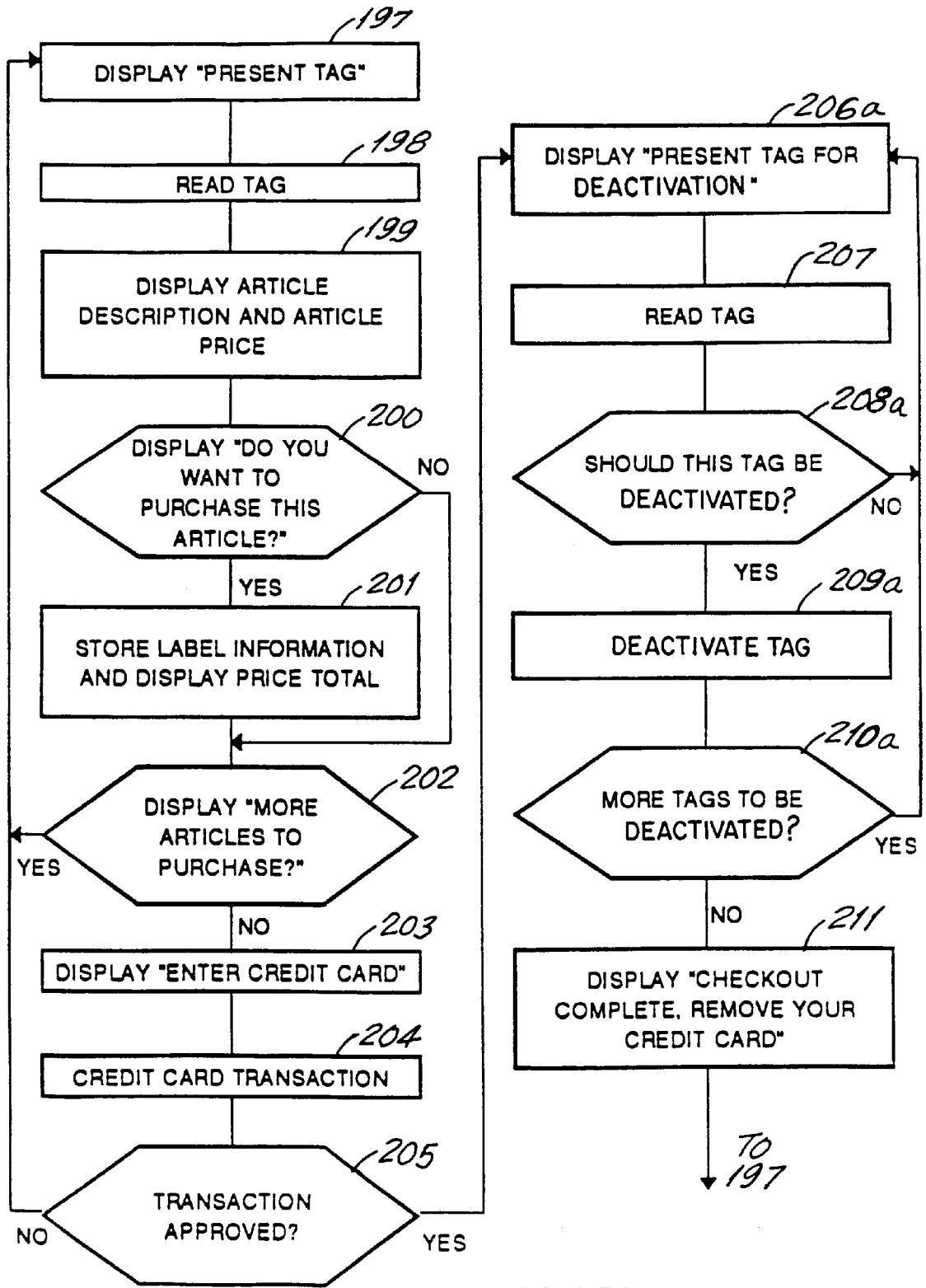
FIG. 10b is a flow chart depicting a further embodiment of the operation of the FIG. 7b system.

A still further embodiment is describe with reference to the flow chart of FIG. 10a. In this embodiment, the hanger tags 122 are not required. The symbol 128 on the surveillance tag 126 is used to particularly identify each article 120. For example, the symbol 128, which identifies each article 120, is printed on a label which is then affixed to the surveillance tag 126.

Referring to FIG. 10a, at STEP 197, the message "PRESENT TAG" is displayed on the display 178 so that a customer, upon approaching the terminal 140, will know that the terminal is available for self-checkout operation.

At STEP 198, when the customer passes the surveillance tag 126 between the upper work surface 150 and the housing 144, the symbol 128 is read and decoded in the well known manner, and the decoded value thereof is stored in the microprocessor 164.

At STEP 199, the microprocessor uses the decoded value of the symbol 128 obtained in STEP 198 to interrogate a description and price database (not shown) to obtain the description and the price of the article 120 to which the surveillance tag 126 is attached. The article description and price are displayed on the display 178.

At STEP 200, the message "DO YOU WANT TO PURCHASE THIS ARTICLE?" is placed on the display 178. If the user responds YES, by pressing a predetermined key on the keyboard 176, progress is made to STEP 201, where the decoded value of the symbol 128 is stored in memory (not shown) within the microprocessor 164 and the price of the article is added to a Running Total Price for this checkout sequence. The Running Total Price is displayed 178 so that the customer can see the total cost of all articles purchases. However, if the customer responds NO at STEP 200, by pressing a predetermined key, progress is made to STEP 202.

At STEP 202, the message "MORE ARTICLE TO BE PURCHASED?" appears on the display 178. If the user responds YES, by pressing a predetermined key on the keyboard 176, the flow branches back to STEP 197 where the next article can be processed. If the customer responds NO, by pressing a predetermined key, progress is made to STEP 203 where the customer is instructed by the display 178 to "ENTER CREDIT CARD". When the customer's credit card 174 is entered into slot 172 the credit card reader 170 is activated.

At STEP 203 the customer is instructed by the display 178 to "ENTER CREDIT CARD".

At STEP 204 the credit card transaction for the Running Total Price is effected in the normal way. For example, the terminal 146 may communicate with a remote facility where the transaction is approved.

At STEP 205, if the credit card transaction is denied, an appropriate message is displayed to the customer apprising them of the denial and directing them not to remove the articles from the store. Since the surveillance tags 126 are still attached to the articles 120, attempts to remove the articles 120 from the store would be detected in the normal manner. If the credit card transaction is approved, progress is made to STEP 206.

At STEP 206, the display prompts the customer to present the surveillance tag 126 for removal by displaying the message "PRESENT TAG FOR REMOVAL".

AT STEP 207, the customer presents the surveillance tag 126 for removal by positioning the tag in a deactivation region (i.e., by inserting the pin member 130 of the tag 126 into the well 168). The microcomputer detects the insertion of the pin member 130 by detection means (not shown), such as, for example, an optical switch, mechanical switch, hall effect switch, etc. Responsive to such detection, the microcomputer 164 activates the reader within the housing 144 to automatically read the symbol 128 on the surveillance tag 126. Alternatively, the detection means can be eliminated and the customer can be required to press a predetermined key on the keypad 176 after the insertion of the pin member 130 into the well 168 is completed. Responsive to the predetermined key the microcomputer activates the reader.

At STEP 208, the symbol 128 read in step 192 is compared with the symbols 128 of the surveillance tags 126 previously stored in memory at STEP 201, and if a match is found, it is determined that the surveillance tag 126 is attached to an article 120 which has been properly purchased, and therefore, can be remove from the article. If no match is found, the article 120 has not been purchased, and therefore, the tag should not be removed and progress is made to STEP 206.

At STEP 209, the microcomputer 164 enables the decoupler 166 which in turn removes, or permits the customer to remove, the pin 130. Further, the microcomputer removes from memory one copy of the symbol 128 of the removed surveillance tag 126 so as to prevent a similar surveillance tag 126, attached to a similar article, from being removed. In this manner, only tags associated with articles which have been purchased can be removed from the articles.

At STEP 210, the microcomputer checks the memory to determine whether there are still symbols 128, which were stored in STEP 201, contained therein. If YES, progress is made to STEP 206 where more surveillance tags 126 can be removed.

At STEP 211, the surveillance tags 126 of all the article which were purchased have been removed. The customer is instructed "CHECKOUT COMPLETE, REMOVE YOUR CREDIT CARD".

As can be appreciated, the embodiment described with reference to FIG. 10a provides for a reliable and secure self-checkout operation, where the customer is prevented from purposely or inadvertently removing surveillance tags from articles which have not been purchased. Further, in this embodiment, the requirement of attaching both an attached hanger tag 122 and a surveillance tag 126 to each article 120 is eliminated.

In the embodiments described with reference to FIG. 9a, each article is scanned and selected for purchase (STEPS 182–187), then the credit card transaction is processed (STEPS 203–205), followed by the process of removing all the appropriate surveillance tags 126 (STEPS 191–195). Accordingly, each article is required to be handled twice by the customer (i.e., first to scan and purchase the article and then, after the credit card transaction, the article is handled a second time to effect removal of the surveillance tag 126).

A still further embodiment is described with reference to FIG. 11, where, in effecting self-checkout, the customer only has to pick up each article 120 a single time. For this embodiment, the symbol 124 of the hanger tag 122 is the same value as the symbol 128 on the corresponding surveillance tag 126. Referring to the flow chart of FIG. 11, at STEP 212, the display 178 instructs the customer to enter their credit card 174 (or a debit card such as "smart card") into slot 172.

At STEP 213, the card reader 170 reads the card 174 and, in a manner well known in the art, determines the amount of credit available for that card. For example, where the card 174 is a credit card, the card reader 170 communicates with a remote facility (not shown) which provides information regarding the available credit on the card 174. In the case where the card 174 is a debit card ("smart card"), the card reader 170 can read the contents of the debit card 174 to determine the available credit.

At STEP 214, the message "PRESENT ARTICLE LABEL" is displayed on the display 178

At STEP 215, when the customer passes the hanger tag 122 between the upper work surface 150 and the housing 144, the symbol 124 is read and decoded in the well known manner, and the decoded value thereof is stored in the microprocessor 164.

At STEP 216, the microprocessor uses the decoded value of the symbol 124 obtained in STEP 183 to interrogate a description and price database (not shown) to obtain the description and the price of the article 120 to which the hanger tag 122 is attached. The article description and price are displayed on the display 178.

At STEP 217, the price for the article 120 is compared with the total credit determined to be available for card 174 in STEP 213. If the article's price is greater than the credit available for the card 174, progress is made to STEP 218 where the message "INSUFFICIENT FUNDS, YOUR AVAILABLE CREDIT IS $_____ " is placed on the display 178. If sufficient credit is available, progress is made to STEP 219.

At STEP 219, the message "DO YOU WANT TO PURCHASE THIS ARTICLE?" is placed on the display 178. If the user responds YES by pressing a predetermined key on the keyboard 176, progress is made to STEP 225. However, if the customer responds NO by pressing a predetermined key, progress is made to STEP 220.

At STEP 220, the display prompts the customer to present the surveillance tag 126 for removal by displaying the message "PRESENT TAG FOR REMOVAL".

AT STEP 221, the customer presents the surveillance tag 126 for removal by placing the tag 126 in a deactivation region (i.e., by inserting the pin member 130 of the tag 126 into the well 168). The microcomputer detects the insertion of the pin member 130 by detection means (not shown), such as, for example, an optical switch, mechanical switch, hall effect switch, etc. Responsive to such detection, the microcomputer 164 activates the reader within the housing 144 to automatically read the symbol 128 on the surveillance tag 126. Alternative, the detection means can be eliminated and the customer can be required to press a predetermined key on the keypad 176 after the insertion of the pin member 130 into the well 168 is completed. Responsive to the predetermined key the microcomputer activates the reader.

At STEP 222, the symbol 124 read in step 215 is compared with the symbol 128 of the surveillance tag 126 read in STEP 221, and if they match, it is determined that the surveillance tag 126 is attached to an article 120 which has been selected for purchase, and therefore, can be remove from the article. If no match is found, the article 120 has not been selected for purchase, and therefore, the tag should not be removed and progress is made to STEP 220.

At STEP 223, the microcomputer 164 enables the decoupler 166 which in turn removes, or permits the customer to remove, the pin 130.

At STEP 224, the microcomputer instructs the card reader to debit the card 174 by the amount of the purchase price for the article 120. The microcomputer also adds the price of the article to a running total price which is then displayed on the display 178.

At STEP 225, the message "MORE ARTICLE TO BE PURCHASED?" appears on the display 178. If the user responds YES, by pressing a predetermined key on the keyboard 176, the flow branches back to STEP 213 where the next article can be processed. If the customer responds NO, by pressing a predetermined key, progress is made to STEP 226 where the message "CHECKOUT COMPLETED, REMOVE YOUR CREDIT CARD" is displayed 178.

Figure 11A:
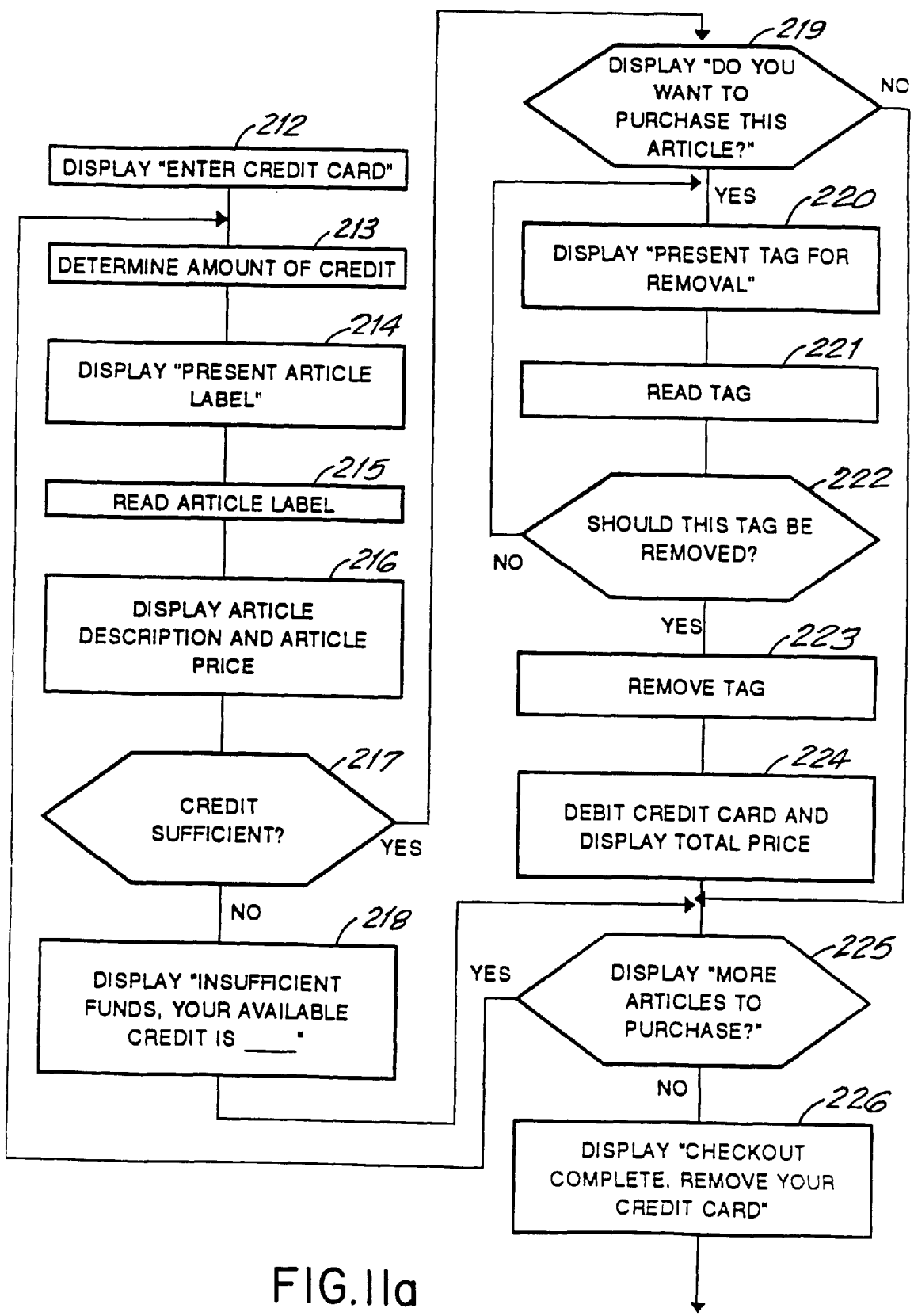
FIG. 11a is a flow chart depicting a still further embodiment of the operation of the FIG. 7a system.
Figure 11B:
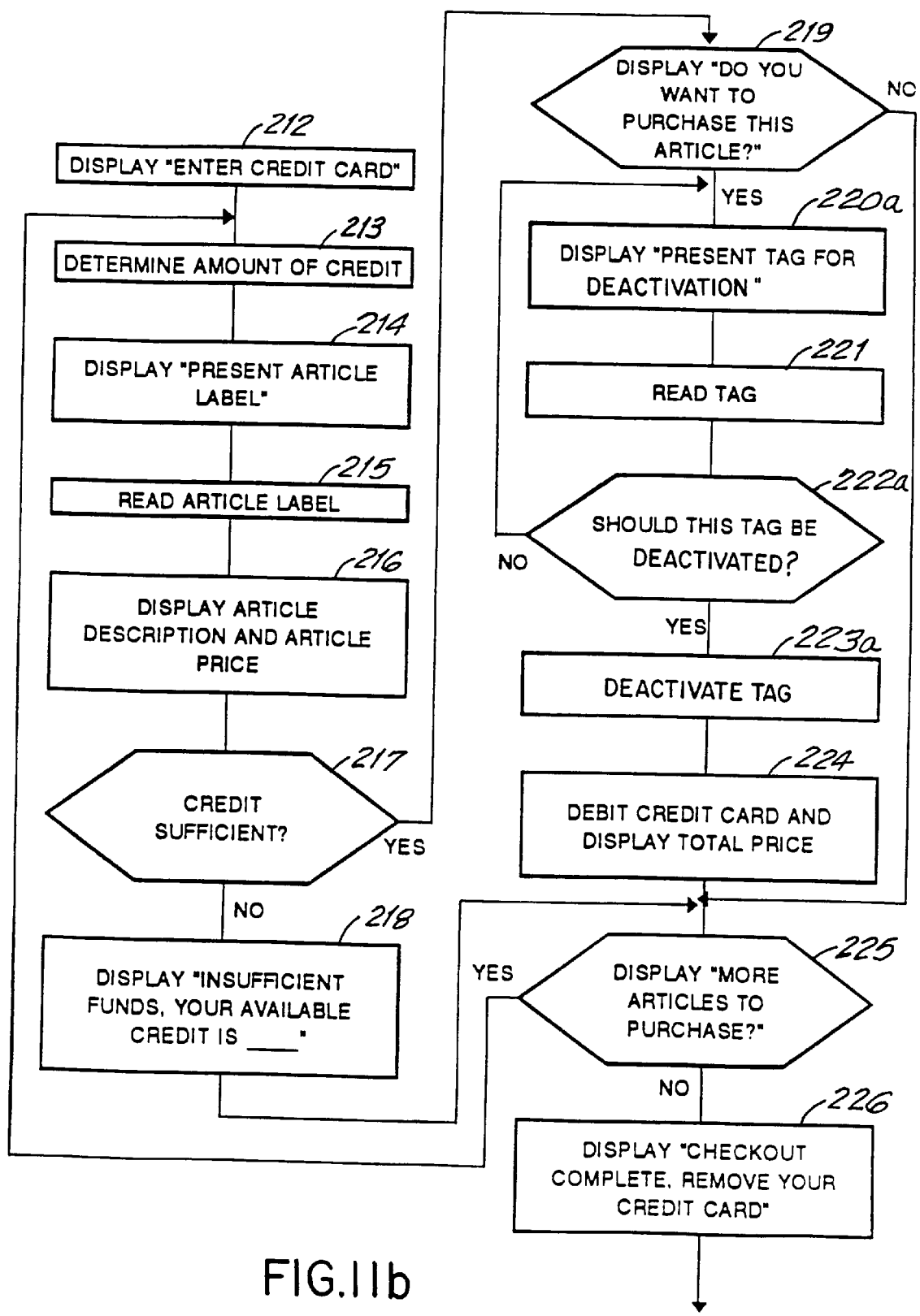
FIG. 11b is a flow chart depicting a still further embodiment of the operation of the FIG. 7b system.

As can be appreciated, in the embodiment describe with reference to FIG. 11, after the customer inserts their credit card 174 into the slot (STEP 212), the customer is only required to handle each article 120 once to effect the purchase and the removal of the surveillance tag 126. More particularly, the customer will pick-up an article 120 to be purchased and in STEPS 214–219 the article will be selected for purchase. Then, without being required to place the article down, STEPS 220–223 are effected to remove the surveillance tag 126.

Figure 12A:
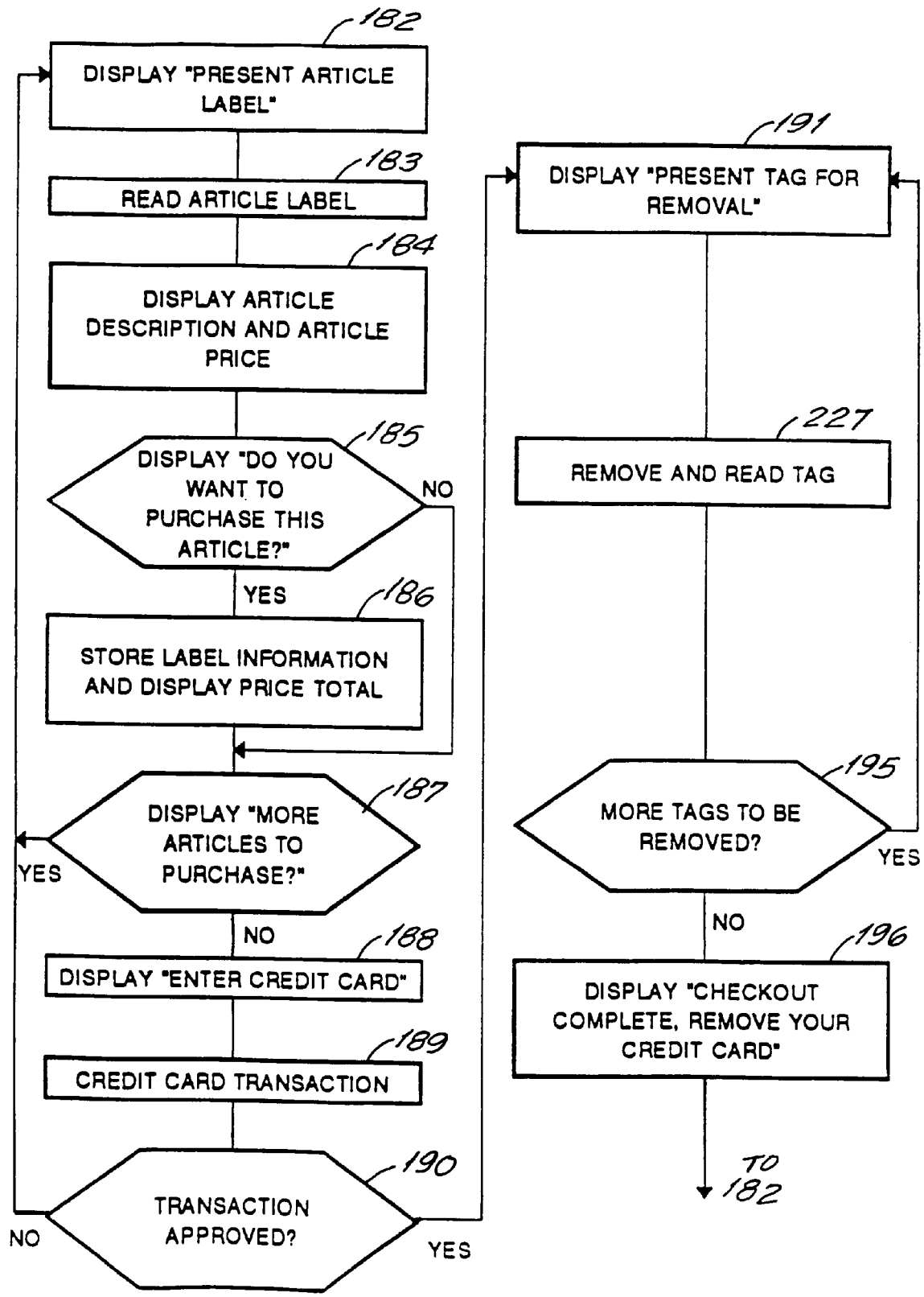
FIG. 12a is a flow chart depicting yet a further embodiment of the operation of the FIG. 7a system.
Figure 12B:
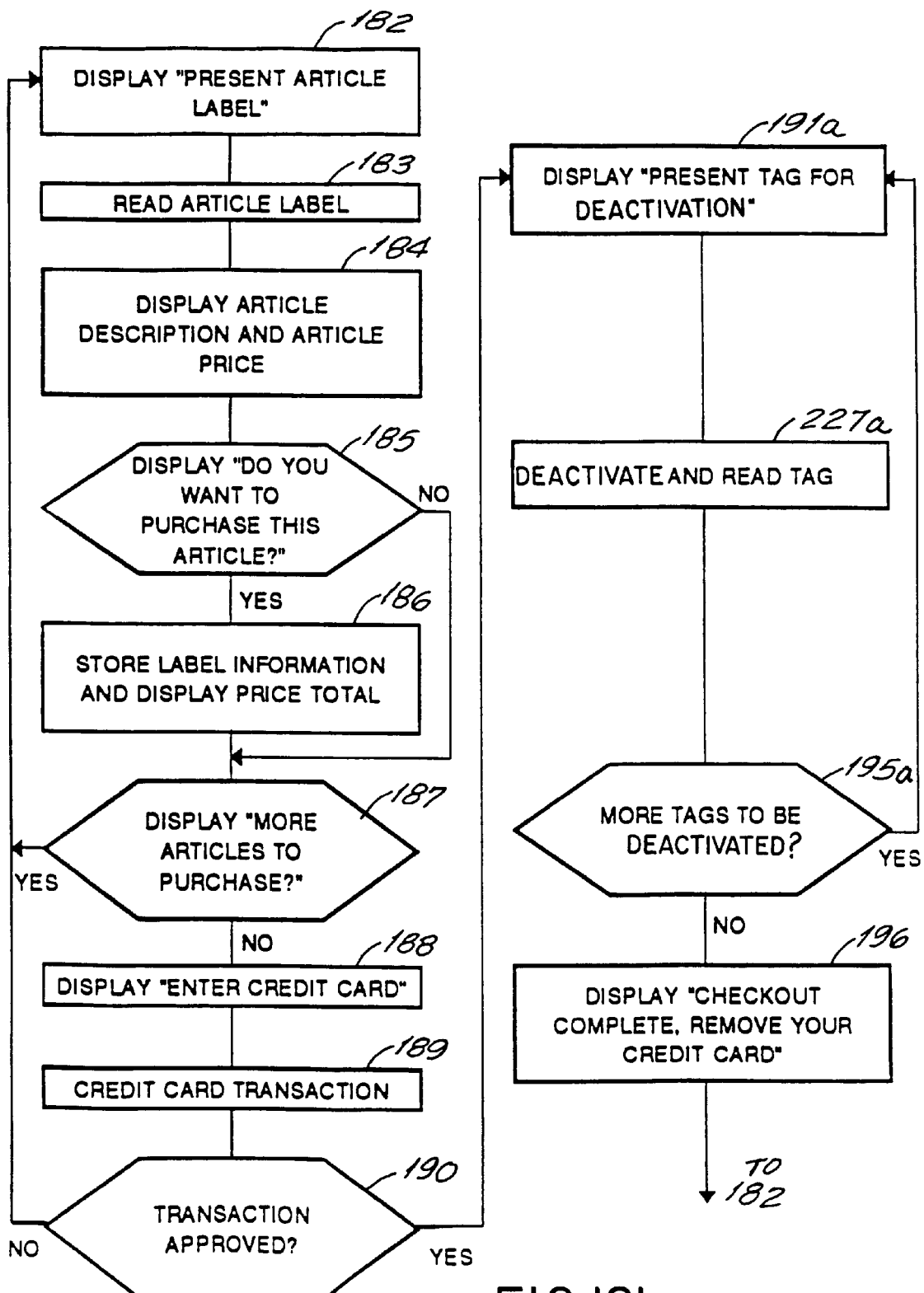
FIG. 12b is a flow chart depicting yet a further embodiment of the operation of the FIG. 7b system.

In a still further embodiment, a system for, and method of, confirming when a surveillance tag 126 is removed from an article 120 is described with the aid of FIG. 12a, STEPS 182–191 and STEPS 195–196 of FIG. 12 are identical to the corresponding STEPS described previously with reference to FIG 9a, and therefore, repeated description thereof is omitted.

In STEP 227, when the tag is presented for removal by placing the tag in the deactivation region (i.e., by inserting the pin member 130 into the well 168), the decoupler 166 separates the pin member 130 from the socket member 134. Concomitantly, with the separation of the pin member 130 and the socket member 134, the microprocessor 164 activates the reader within the housing 144 to automatically read the symbol 128. The microprocessor then stores in memory information that the tag 126 having the symbol 128 has been removed.

Accordingly, in this embodiment, the use of the coded symbol on the surveillance tag insures that the system is reliably and automatically advised when tag removal has occurred.

The foregoing aspects of the inventions have been illustrated and described as functioning with non-deactivatable surveillance tags 126 which are mechanically locked to the articles 120, and where the tags 126 are removed to allow removal of the article. However, it is not intended that the invention be so limited, since various types of deactivatable type tags can be used in accordance with the present invention, where the deactivatable type tag is deactivated instead of being removed from the article. For example, referring to STEP 194 of FIG. 9a, instead of removing the tag 126 using a decoupler, a deactivatable type tag placed in the deactivating region can be deactivated by, for example, inductively coupling an electromagnetic field to the tag. As a further alternative, as means for accepting payment, the credit card reader 170 can be replaced by a cash reader (i.e., cash is received, evaluated and stored). Still further, the overhead scanner 156 can be replaced with slot scanner for reading bar codes.

In particular, FIGS. 7*b* through 12*b* illustrate an alternative embodiment of the present invention which is identical to that shown in FIGS. 7*a* through 12*a* except the tag removal apparatus and method steps are replaced with tag deactivation apparatus and method steps. Those components and steps in FIGS. 7*b*–12*b* identical to those in FIGS. 7*a*–12*a* are given the same reference numerals. The embodiments shown in FIGS. 7*b*–12*b* operate in the same fashion as those corresponding embodiments in FIGS. 7*a*–12*a* except for the tag which is initially in the activated state, is deactivated by a tag deactivation means 166*a* rather than removed when a match is found between the symbol 124 of the hanger tag 122 and the symbol 128 of the surveillance tag 126.

While the foregoing aspects of the invention have been illustrated and described as embodied in a self-checkout, point-of-transaction system including removable, electro-optically coded surveillance tags, it is not intended to be limited to the details shown, since various modifications and structural changes may be made without departing in any way from the spirit of the present invention.

Figure 13:
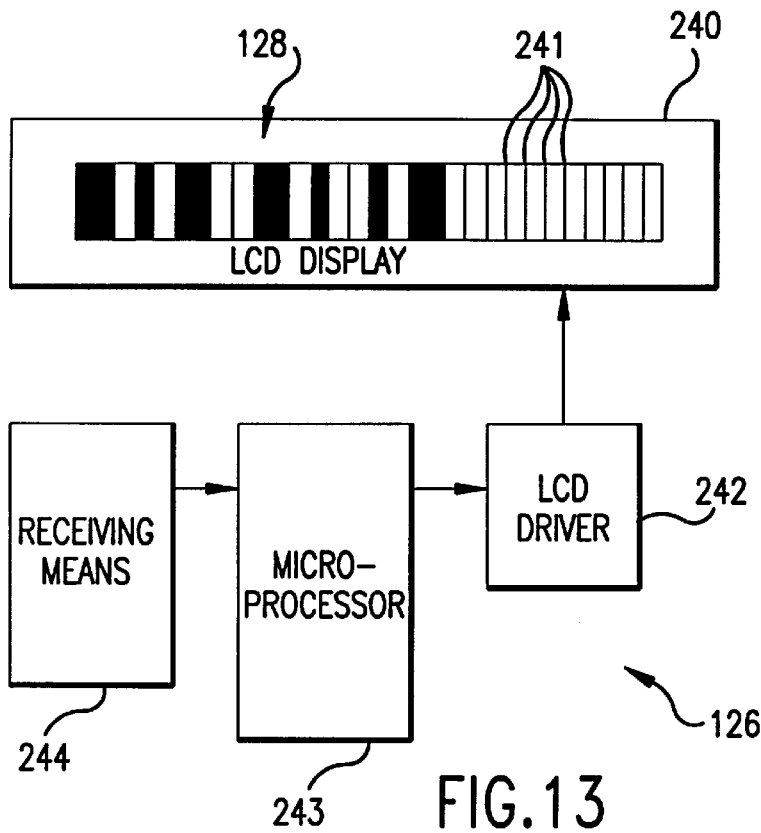
FIG. 13 is a block diagram of a surveillance tag having a dynamically changeable display for displaying coded indicia according to still another embodiment of the present invention.

A further aspect of the present invention is shown in FIG. 13. The symbol 128 (i.e., coded indicia) on the surveillance tag 126 is visually displayed on a liquid crystal display 240 (LCD) included in the tag 126. The contrast between the ON and the OFF segments 241 of the LCD is sufficient to enable the symbol 128 displayed on the LCD to be read and decoded by conventional scanner means. The use of an LCD in a surveillance tag for displaying alphanumeric characters representing the price and description of an article to which the tag is attached is described in U.S. Pat. No. 5,005,125. However, it is noted that U.S. Pat. No. 5,005,125 does not use the LCD to display machine readable symbols (for example, bar codes) as now described.

U.S. Pat. No. 5,003,251, which is hereby incorporated by reference, is directed to mounting an LCD to a printed circuit board, where the LCD displays bar codes which uniquely identifies the board. When the board undergoes testing and evaluation, the results are stored in computer memory along with the identification number. Subsequent to the time of testing, if anyone is interested in reviewing the original test data, the bar code displayed on the LCD is scanned which indirectly addresses the data.

The LCD 240 has a number of uniform rectangularly shaped segments 241 arranged in a parallel relationship. Each segment can be selectively turned ON (i.e., appears black) or turned OFF (i.e., appears white) by the LCD driver means 242. In this way the symbol 128 displayed on the LCD can be dynamically changed. A microcomputer 243 contains an internal memory (not shown), which stores a string of ASCII characters corresponding to the symbol 128 to be displayed on the LCD. Receiving means 244 receives and decodes control signals and provides the decoded control signal to the microcomputer 243. The microcomputer 243 changes the contents of the internal memory (not shown) based on the contents of the decoded control signal.

The receiving means 244 can be, for example, a RF transceiver for communicating with remote RF devices. U.S. Pat. No. 5,029,183, herein incorporated by reference, describes a RF communication network and protocol for RF communications. Further, the receiving means 244 can be a light sensing device which is responsive to the laser light of a scanner which is normally used to scan the symbol. To communicate with the receiving means 244, the scanner is arranged to modulate its laser to communicate to the receiver means information relating to the symbol to be displayed. The receiving means 244 demodulates the received signal and provides the demodulated signal to the microcomputer 243. Still further, the receiving means 244 can be circuitry arranged to receive data from keyboards, remote computers, remote scanning terminals, remote infrared LED's, etc.

The microcomputer 243 determines, based on the ASCII value for the symbol stored in the internal memory (not shown), which of the segments 241 are required to be ON and which are required to be OFF in accordance with the bar code symbology selected for the particular tag 126, and communicates such information to the LCD driving means 242. The LCD driving means 242 then causes the segments 241 on the LCD 240 to display the bar code symbol 128 which corresponds to the ASCII value stored in the internal memory.

The symbol 128 displayed on the LCD 240 of the tag 126 described in FIG. 13 can be dynamically altered based upon the data provided by the receiving means 244. In this way, the symbol 128 for the tag 126 can be initially set, and subsequently changed, without requiring that the symbol be printed on a label to be affixed to the tag, or that the symbol be printed directly on the tag.

A further use for the dynamically alterable symbol, is described with reference to FIG. 7. The symbol 124 on the hanger tag 122 can be scanned by a portable scanning terminal (not shown). The portable scanning terminal then communicates the decoded value of the symbol 124 to the receiving means 244 of the surveillance tag 126, which then displays on the LCD 240 a symbol 128 which corresponds to the symbol 124 on the hanger tag. In this way, the symbol 128 on the surveillance tag 126 is set to match the symbol 124 on the hanger tag 122. Still further, any of the embodiments previously described with reference to FIGS. 9–12 can utilize a tag 126 having a dynamically alterable symbol 128 as described with reference to FIG. 13.

The surveillance tag 126 as shown in FIG. 13, which has a dynamically alterable symbol 128, can also be used effectively in price markdown/markup applications. In price markdown/markup application, at least a portion of the symbol 128 on the surveillance tag 126 is used to represent, in machine readable form, the price of the attached article. To effect a price change, an updated symbol, including therein a new price, is provided to the receiving means 244 of the tag 126, and therefore, the symbol 128 on the tag is changed to reflect the new price.

The price markdown/markup application above described provides additional labor savings when the receiving means 244 of the tag 126 is a transceiver which is arranged to receive RF communications from a remote RF transmitter (not shown). Accordingly, the remote RF transmitter is used to transmit the new price information to each surveillance tag 126 which requires the price change. In this way, the price changes are effected remotely without requiring a person to physically visit each surveillance tag to effect the change.

Figure 14:
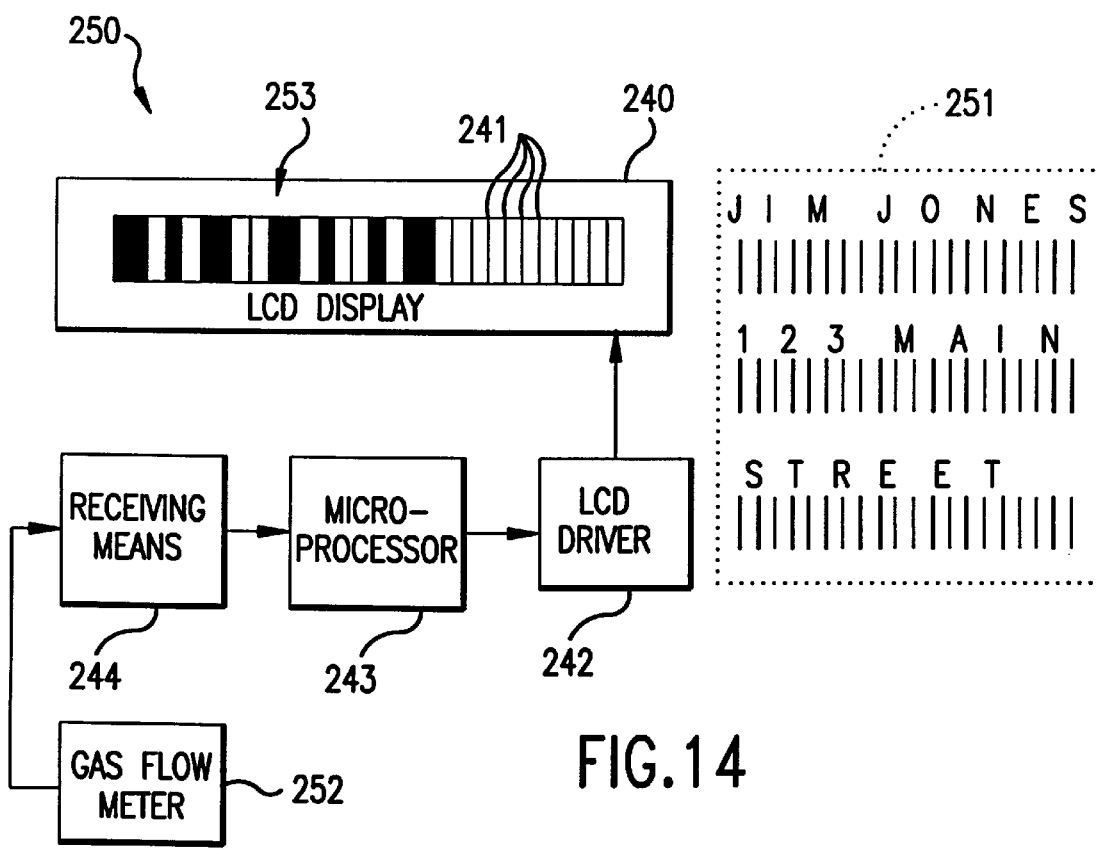
FIG. 14 is a block diagram illustrating a gas meter having a dynamically changeable display for displaying coded indicia according to still another embodiment of the present invention.

As further aspects of the present invention, LCD displays can be used in devices other than surveillance tags for dynamically displaying machine readable symbols. For example, referring to FIG. 14, a gas meter 250 is shown where preprinted (not dynamic) symbols 251 are combined with dynamically alterable symbols 241 displayed on an LCD display. In the embodiment shown, the preprinted symbols 251 contain predetermined information associated with a person responsible for paying for the gas usage. A gas flow measuring device 252 measures the volume of gas used and periodically communicates the results through the receiving means 244 to the microprocessor 243. The receiving means 244, the microprocessor 243, the LCD driver 242 and the LCD 240 are the same as those described in FIG. 13. Accordingly, responsive to the signal received by the receiving means, the tag 126 displays on the LCD 240 a symbol which corresponds to the volume of gas used.

When reading the meter, both the preprinted symbols 251 and the dynamic symbol 241, representative of the gas usage, can be read and decode using a portable scanning terminal (for example, Symbol Technologies model LRT3800) and the results stored in a database. The database can then be downloaded to a computer which prepares bills. As can be appreciated, since both the preprinted symbols 251 and the dynamic symbol 241 are automatically read by the portable scanning terminal, the reliability of the data is much higher than if some of the information was manually entered.

While the above aspects of the present invention have been illustrated and described as embodied in a surveillance tag, shelf tag and in a gas meter, it is not intended that the dynamically alterable symbol to be limited to the details and applications shown, since variations and modifications and structural changes can be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An article transaction processing system, comprising:
   a) a database for storing article symbols identifying articles, for storing tag symbols identifying surveillance tags, and for associating respective tags with respective articles on which the respective tags are mounted;
   b) a reader for electro-optically reading an article symbol to identify a selected article to be processed, and for subsequently electro-optically reading a tag symbol to identify the respective tag on the selected article;
   c) a control processor for communicating with the database after the article symbol and the tag symbol have been read, for determining whether the identified tag is associated with the identified article; and
   d) a transaction processor for completing a transaction with the selected article upon the determination that the identified tag is associated with the identified article.

2. The system in accordance with claim 1; and further comprising a plurality of terminals in wireless communication with the database, and wherein the reader and the processors are located in one of the terminals; and further comprising additional readers, additional control processors, and additional transaction processors located in others of the terminals.

3. The system in accordance with claim 2, wherein the database is located in a host computer remote from the terminals.

4. The system in accordance with claim 1; and further comprising a sales terminal in which the reader and the processors are located, for completing the transaction as a sale of the selected article; and wherein the sales terminal includes means for effecting the sale by a financial payment.

5. The system in accordance with claim 4, wherein the sales terminal includes a card reader, and a slot for receiving a card bearing financial information to be read.

6. The system in accordance with claim 4, wherein the sales terminal includes a keypad for enabling manual entry of information relating to the transaction.

7. The system in accordance with claim 4, wherein the sales terminal includes a display for displaying information relating to the transaction, including visible messages for prompting a user through the transaction.

8. The system in accordance with claim 4, wherein the transaction processor includes a tag remover for enabling the identified tag to be removed from the identified article.

9. The system in accordance with claim 4, wherein the transaction processor includes a tag deactivator for deactivating the identified tag.

10. The system in accordance with claim 9, wherein each tag has an electronic component switchable between activated and deactivated states upon receipt of a radio frequency signal.

11. The system in accordance with claim 1, wherein the article symbol and the tag symbol are bar code symbols.

12. The system in accordance with claim 11, wherein the bar code symbols are the same.

13. The system in accordance with claim 11, wherein the bar code symbols are different.

14. The system in accordance with claim 1, wherein the tag symbols are printed on respective labels respectively mounted on the tags.

15. The system in accordance with claim 1, wherein the article symbols are printed on respective labels respectively mounted on the articles.

16. The system in accordance with claim 1, wherein the reader includes a light source for generating a light beam, a detector having a field of view and operative for detecting light reflected from a respective symbol, and a scanner for scanning at least one of the light beam and the field of view in a scan over the respective symbol.

* * * * *